(12) United States Patent  (10) Patent No.: US 8,625,311 B2
Hosotani et al.  (45) Date of Patent: Jan. 7, 2014

(54) SWITCHING POWER SUPPLY APPARATUS INCLUDING A PLURALITY OF SWITCHING ELEMENTS

(75) Inventors: Tatsuya Hosotani, Nagaokakyo (JP); Yoshiyuki Uno, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 13/272,388

(22) Filed: Oct. 13, 2011

(65) Prior Publication Data

US 2012/0033455 A1 Feb. 9, 2012

Related U.S. Application Data

(63) Continuation of application No. PCT/JP2010/055343, filed on Mar. 26, 2010.

(30) Foreign Application Priority Data

Apr. 14, 2009 (JP) ................................ 2009-098183

(51) Int. Cl.
 *H02M 3/335* (2006.01)
 *H02M 3/137* (2006.01)
 *H02M 1/38* (2007.01)
(52) U.S. Cl.
 USPC .................... 363/21.03; 323/284; 363/21.04; 363/21.12
(58) Field of Classification Search
 USPC ............ 323/282, 284, 285; 363/21.02, 21.03, 363/21.04, 21.08, 21.1, 21.12, 21.16, 21.18, 363/56.04, 98
 See application file for complete search history.

(56) References Cited

U.S. PATENT DOCUMENTS

| 4,785,387 A | 11/1988 | Lee et al. |
| 4,947,309 A * | 8/1990 | Jonsson ......................... 363/17 |
| 5,430,633 A | 7/1995 | Smith |

(Continued)

FOREIGN PATENT DOCUMENTS

| EP | 0 998 017 A2 | 5/2000 |
| JP | 04-076185 U | 7/1992 |

(Continued)

OTHER PUBLICATIONS

UC3823 High Speed PWM Controller datasheet. Unitrode Products from Texas Instruments. Orig. pub. Mar. 1997. Obtained from http://www.ti.com/lit/ds/symlink/uc3823.pdf on Dec. 10, 2012.*

(Continued)

*Primary Examiner* — Adolf Berhane
*Assistant Examiner* — Fred E Finch, III
(74) *Attorney, Agent, or Firm* — Keating & Bennett, LLP

(57) ABSTRACT

In a switching power supply apparatus, a comparator outputs a first determination criterion signal based on a saw-tooth wave signal whose level fluctuates with a constant period and a detection voltage signal. An inverter subjects the first determination criterion signal to reverse processing, and outputs a second determination criterion signal. The comparator outputs a first switching judgment-use signal from a monitor signal and a threshold value, and the comparator outputs a second switching judgment-use signal from the monitor signal and the threshold value. An AND circuit outputs the first switching control signal from the first determination criterion signal and the first switching judgment-use signal, and the AND circuit outputs the second switching control signal from the second determination criterion signal and the second switching judgment-use signal.

17 Claims, 24 Drawing Sheets

(56) References Cited

U.S. PATENT DOCUMENTS

| | | | |
|---|---|---|---|
| 5,434,768 A * | 7/1995 | Jitaru et al. | 363/21.01 |
| 5,541,541 A * | 7/1996 | Salamina et al. | 327/108 |
| 5,808,879 A * | 9/1998 | Liu et al. | 363/17 |
| 5,933,341 A * | 8/1999 | Kuriyama et al. | 363/98 |
| 5,973,939 A * | 10/1999 | Tan | 363/21.06 |
| 6,025,706 A | 2/2000 | Takimoto et al. | |
| 6,452,814 B1 * | 9/2002 | Wittenbreder | 363/16 |
| 6,631,082 B2 * | 10/2003 | Birumachi | 363/97 |
| 6,836,414 B1 * | 12/2004 | Batarseh et al. | 363/17 |
| 7,098,630 B2 * | 8/2006 | Jonsson | 323/222 |
| 7,321,498 B2 * | 1/2008 | Cebry | 363/21.02 |
| 2001/0031471 A1 | 10/2001 | Ishizuka et al. | |
| 2001/0036085 A1 | 11/2001 | Narita | |
| 2002/0067624 A1 | 6/2002 | Nishiyama et al. | |
| 2002/0080634 A1 | 6/2002 | Nozawa et al. | |
| 2003/0179592 A1 | 9/2003 | Nishiyama et al. | |
| 2003/0231011 A1 | 12/2003 | Umemoto et al. | |
| 2004/0041619 A1 * | 3/2004 | Nadd | 327/436 |
| 2004/0130307 A1 * | 7/2004 | Dequina et al. | 323/282 |
| 2005/0110475 A1 * | 5/2005 | Chapuis | 323/282 |
| 2006/0164867 A1 * | 7/2006 | Dikken et al. | 363/13 |
| 2006/0181230 A1 | 8/2006 | Hosotani et al. | |
| 2007/0076448 A1 | 4/2007 | Usui | |
| 2007/0090819 A1 * | 4/2007 | Hasegawa et al. | 323/282 |
| 2007/0165426 A1 * | 7/2007 | Kyono | 363/21.02 |
| 2008/0012540 A1 * | 1/2008 | Chen | 323/224 |
| 2008/0278973 A1 * | 11/2008 | Lin et al. | 363/21.08 |
| 2009/0027020 A1 * | 1/2009 | Qiu et al. | 323/282 |
| 2009/0196075 A1 * | 8/2009 | Arduini | 363/21.06 |
| 2010/0020569 A1 * | 1/2010 | Melanson et al. | 363/21.03 |

FOREIGN PATENT DOCUMENTS

| | | |
|---|---|---|
| JP | 05-252795 A | 9/1993 |
| JP | 2000-116147 A | 4/2000 |
| JP | 2001-037220 A | 2/2001 |
| JP | 2001-258269 A | 9/2001 |
| JP | 2002-165442 A | 6/2002 |
| JP | 2002-369516 A | 12/2002 |
| JP | 2004-312913 A | 11/2004 |
| JP | 2005-184964 A | 7/2005 |
| WO | 2005/076447 A1 | 8/2005 |

OTHER PUBLICATIONS

Official Communication issued in International Patent Application No. PCT/JP2010/055343, mailed on Jun. 29, 2010.

Hosotani et al., "Switching Power Supply Apparatus," U.S. Appl. No. 13/272,387, filed Oct. 13, 2011.

* cited by examiner

SWITCHING POWER SUPPLY APPARATUS INCLUDING A PLURALITY OF SWITCHING ELEMENTS

BACKGROUND OF THE INVENTION

1. Field of the Invention

The present invention relates to a switching power supply apparatus, such as a resonance-type power supply apparatus or a half-bridge-type power supply apparatus, for example, which outputs a predetermined voltage signal by causing a plurality of switching elements to be alternately turned on and off.

2. Description of the Related Art

In the past, various kinds of switching power supply apparatuses have been developed, each of which outputs a predetermined voltage signal by causing a plurality of switching elements to be alternately turned on and off. For example, in a switching power supply apparatus that utilizes a PWM method of a half-bridge-type converter, a time ratio is adjusted at a constant switching frequency, thereby obtaining a desired output voltage signal. However, in such a switching power supply apparatus in which a plurality of switching elements are alternately turned on and off, if there is a time period when a plurality of switching elements are simultaneously turned on, a large short-circuit current flows, and there is a possibility that the power supply apparatus will be destroyed. Therefore, a dead time is provided in which all of the plurality of switching elements are turned off.

Since such a dead time is provided, a switching power supply apparatus disclosed in WO2005-076447 includes a first switching element and a second switching element that are alternately turned on and off, and the change of magnetic flux of a transformer due to the turning off of the first switching element is used as a trigger to turn on the second switching element. In addition, the change of magnetic flux of a transformer due to the turning off of the second switching element is used as a trigger to turn on the first switching element. By performing such switching control as described above, the first switching element and the second switching element are prevented from being simultaneously in an on state.

However, in the above-described switching power supply apparatus disclosed in WO2005-076447, since the on-time of the second switching element is determined by a time constant circuit including a resistor and a capacitor, a switching frequency varies and a switching noise occurs in a wide range in response to the variation of the switching frequency.

In addition, while the time constant circuit is designed to take into account the dead time, since a dead time having the same time length is set in a full load region, namely even in a transient state and a steady state, it is difficult to set an optimal dead time in the steady state in which a dead time as long as that in the transient state is not necessary. Accordingly, the above-described switching power supply apparatus is less than optimal in terms of efficiency but has a high degree of reliability.

SUMMARY OF THE INVENTION

To overcome the problems described above, preferred embodiments of the present invention provide a switching power supply apparatus that preferably includes a plurality of switching elements that are prevented from being simultaneously turned on while a switching frequency is maintained constant or substantially constant, and switching is performed with an optimal dead time.

A preferred embodiment of the present invention provides a switching power supply apparatus preferably including a direct-current power-supply input unit to which a direct-current input voltage is input, a transformer being configured by one magnetic component and including at least a first primary winding and a first secondary winding that are magnetically coupled, an inductor connected in series to the first primary winding, a first switch circuit including a parallel circuit including a first switching element, a first capacitor, and a first diode, a second switch circuit including a parallel circuit including a second switching element, a second capacitor, and a second diode, a third capacitor, a first series circuit that is connected to both end portions of the direct-current power-supply input unit and in which the first primary winding and the first switch circuit are connected in series, and a second series circuit that is connected to both end portions of the first switch circuit or both end portions of the first primary winding and in which the second switch circuit and the third capacitor are connected in series, wherein the first switch circuit and the second switch circuit are configured to operate such that the first switch circuit and the second switch circuit complementarily repeat turn on and turn off with a time period in between, for which both of the first switch circuit and the second switch circuit are turned off, and the switching power supply apparatus preferably includes a power converter circuit arranged so that an output voltage is output to a secondary side through a first rectification smoothing circuit rectifying and smoothing an alternating-current voltage output from the first secondary winding. The switching power supply apparatus preferably includes a first monitor signal generator arranged to detect the change of a voltage or current in the power converter circuit, which occurs due to the turning off of a switch circuit in an on-state from among the first switch circuit and the second switch circuit, and to generate a monitor signal, an output voltage detector arranged to detect the output voltage, a feedback signal generator arranged to generate a feedback signal according to the output voltage detected by the output voltage detector, and a switching control circuit arranged to control the first switching element and the second switching element.

The switching control circuit preferably includes an oscillator arranged to generate a triangular wave whose frequency is settable and constant or substantially constant, a first comparator arranged to compare the triangular wave signal with the feedback signal, and a second comparator arranged to compare an output signal of the first monitor signal generator with a first threshold value, wherein a gate signal of the first switch circuit and a gate signal of the second switch circuit are generated based on outputs of the first comparator and the second comparator.

With this configuration, the on times of the first and second switching elements are determined by the switching control circuit in an analog IC in an analog format. At this time, a timing to be a trigger for the turning on of each switching element is determined based on the comparison result between the monitor signal based on the transformer voltage and the threshold value and a timing to be a trigger for the turning off of each switching element is determined based on the comparison result between the feedback signal and the triangular wave signal. Therefore, since the turning on of the switching element to be turned on is performed from a start timing including a predetermined delay amount set with the timing of the change of magnetic flux as a reference point, the change of magnetic flux being due to the turning off of the switching element that has most recently been in an on state, individual switching elements are not simultaneously put into on states. Furthermore, the switching frequency becomes constant or substantially constant due to the periodicity of the triangular wave signal. In addition, using the feedback signal, the turn off timing according to the level of the output voltage is obtained, and thus, it is possible to obtain a stable output voltage as a switching power supply apparatus.

In addition, in the switching power supply apparatus according to a preferred embodiment of the present invention, a magnetic polarity of the first primary winding and the first secondary winding is preferably a reverse polarity with respect to a direction of a current flowing when the first switch circuit is in a conduction state or the second switch circuit is in a conduction state.

This configuration produces switching power supply apparatus that is an isolated flyback converter. In addition, even using such a configuration, it is possible to provide switching control according to a preferred embodiment of the present invention.

In addition, in the switching power supply apparatus according to a preferred embodiment of the present invention, a magnetic polarity of the first primary winding and the first secondary winding is the same polarity with respect to a direction of a current flowing when the first switch circuit is in a conduction state or the second switch circuit is in a conduction state.

This configuration provides a switching power supply apparatus that is an isolated forward converter. In addition, even using such a configuration, it is possible to provide switching control according to a preferred embodiment of the present invention.

In addition, in the switching power supply apparatus according to a preferred embodiment of the present invention, the transformer preferably further includes a second secondary winding, the first secondary winding and the second secondary winding are connected in series, and a magnetic polarity of the first primary winding and the first secondary winding and a magnetic polarity of the first primary winding and the second secondary winding are the same polarities with respect to a direction of a current flowing when the first switch circuit is in a conduction state or the second switch circuit is in a conduction state, and the first rectification smoothing circuit preferably includes a center tap-type full-wave rectifier circuit, at least one filter inductor, and at least one smoothing capacitor.

In this configuration, a center tap-method isolated switching power supply apparatus is provided. In addition, even in the switching power supply apparatus having such a configuration, it is possible to provide switching control according to a preferred embodiment of the present invention.

In addition, in the switching power supply apparatus according to a preferred embodiment of the present invention, the transformer preferably further includes a second secondary winding, the first secondary winding and the second secondary winding are connected in series, and a magnetic polarity of the first primary winding and the first secondary winding is a reverse polarity and a magnetic polarity of the first primary winding and the second secondary winding is the same polarity, with respect to a direction of a current flowing when the first switch circuit is in a conduction state or the second switch circuit is in a conduction state, and in the first rectification smoothing circuit, cathode sides of rectifying elements are connected to both end portions of the second secondary winding, respectively, anode sides of the rectifying elements are subjected to common connection, one end portion of at least one filter inductor is connected to the other end portion of the first secondary winding, and at least one smoothing capacitor is connected between the other end portion of the filter inductor and the anodes of the rectifying elements.

This configuration includes the first and second secondary windings, and an isolated switching power supply apparatus is produced in which electrical power transmission can be performed over substantially the entire time period. In addition, even in a switching power supply apparatus having such a configuration, it is possible to provide switching control according to a preferred embodiment of the present invention and a more efficient switching power supply apparatus is provided.

In addition, in the switching power supply apparatus according to a preferred embodiment of the present invention, a primary-side leakage flux of the transformer is preferably used as an inductor.

In addition, in the switching power supply apparatus according to a preferred embodiment of the present invention, a secondary-side leakage flux of the transformer is preferably used as a filter inductor.

In these configurations, since an element of the switching power supply apparatus can be omitted, the circuit configuration of a switching power supply apparatus can be simplified.

In addition, in the switching power supply apparatus according to a preferred embodiment of the present invention, a turn ratio between the first secondary winding and the second secondary winding is preferably about 1:2, for example.

In this configuration, in an isolated switching power supply apparatus in which electrical power transmission can be performed over substantially the entire time period, the output voltage is stable over substantially the entire time period and a ripple is improved.

In addition, in the switching power supply apparatus according to a preferred embodiment of the present invention, the transformer preferably further includes a second primary winding, one end portion of the second primary winding is connected on a low electrical potential side of the direct-current input power supply, and the other end portion thereof is supplied as a direct-current power-supply voltage used for the switching control circuit through a second rectification smoothing circuit.

In this configuration, using the second primary winding (bias winding), it is possible to easily supply a driving power to a control analog IC in a self-driven apparatus.

In addition, in the switching power supply apparatus according to a preferred embodiment of the present invention, the rectifying element of the first rectification smoothing circuit is preferably a field-effect transistor, for example.

This configuration is an example in which a FET is preferably used as the rectifying element of the rectification smoothing circuit. In addition, even in such a switching power supply apparatus, it is possible to provide a switching control according to a preferred embodiment of the present invention.

In addition, in the switching power supply apparatus according to a preferred embodiment of the present invention, the rectifying element of the first rectification smoothing circuit is preferably subjected to on-off control by the switching control circuit.

This configuration is an example in which a FET is used as the rectifying element of the rectification smoothing circuit and an example in which the corresponding FFT is controlled by an analog IC, such as an ASIC or other suitable analog IC, for example, along with the first and second switching elements. In addition, even in such a switching power supply apparatus, it is possible to provide a switching control according to a preferred embodiment of the present invention.

In addition, another preferred embodiment of the present invention provides a switching power supply apparatus that preferably includes a direct-current power-supply input unit to which a direct-current input voltage is input, an inductor defined by one magnetic component, a first switch circuit including a parallel circuit including a first switching element, a first capacitor, and a first diode, and a second switch circuit including a parallel circuit including a second switching element, a second capacitor, and a second diode, wherein a series circuit including the first switch circuit and the second switch circuit is connected to both end portions of the direct-current power-supply input unit, the switching power supply apparatus is arranged so that one end portion of the inductor is connected to a connection point between the first switch circuit and the second switch circuit and, from the other end portion thereof, an output voltage is output through a third capacitor connected in parallel to the first switch circuit. In this switching power supply apparatus, the first switch circuit and the second switch circuit are preferably arranged to operate such that the first switch circuit and the second switch circuit complementarily repeat turning on and turning off with a time period in between, for which both the first switch circuit and the second switch circuit are turned off, and this switching power supply apparatus preferably includes a first monitor signal generator arranged to detect a change of a voltage or a current in the power converter circuit, which occurs due to the turning off of a switch circuit in an on state from among the first switch circuit and the second switch circuit, and to generate a monitor signal, an output voltage detector arranged to detect the output voltage, a feedback signal generator arranged to generate a feedback signal according to the output voltage detected by the output voltage detector, and a switching control circuit arranged to control the first switching element and the second switching element.

This switching control circuit preferably includes an oscillator arranged to generate a triangular wave whose frequency is settable and constant or substantially constant, a first comparator arranged to compare the triangular wave signal with the feedback signal, and a second comparator arranged to compare an output signal of the first monitor signal generator with a first threshold value, wherein a gate signal of the first switch circuit and a gate signal of the second switch circuit are generated based on outputs of the first comparator and the second comparator.

This configuration produces a switching power supply apparatus that is a non-isolated buck-boost converter including a polarity-reversed chopper circuit. In addition, even in such a non-isolated switching power supply apparatus, it is possible to provide the switching control according to a preferred embodiment of the present invention.

In addition, in the switching power supply apparatus according to a preferred embodiment of the present invention, the switching control circuit preferably further includes a third comparator arranged to compare an output signal of the first monitor signal generator with a second threshold value, wherein the gate signal of the first switch circuit is generated based on the outputs of the first comparator and the second comparator, and the gate signal of the second switch circuit is generated based on the outputs of the first comparator and the third comparator.

This configuration is a specific example of a configuration of the switching control unit, and is an example in which three comparators are provided. In addition, even in such a switching power supply apparatus, it is possible to provide the switching control according to a preferred embodiment of the present invention.

In addition, in the switching power supply apparatus according to a preferred embodiment of the present invention, by replacing the second comparator and the third comparator with one hysteresis comparator, for example, the first threshold value and the second threshold value can be specified.

This configuration is a specific example of a configuration of the switching control unit, and is an example in which a portion of the comparator is replaced with the hysteresis comparator. In addition, even in such a switching power supply apparatus, it is possible to provide the switching control according to a preferred embodiment of the present invention.

In addition, in the switching power supply apparatus according to a preferred embodiment of the present invention, a maximum value of an on-time of a pulse width from a time when a signal for turning on one of the first switching element and the second switching element is output to a time when an output signal for turning off the corresponding switching element is generated is preferably restricted to less than a period of the oscillator generating the triangular wave, for example.

In this configuration, the maximum value of the on time of the switching element is restricted based on the period of the triangular wave. In addition, using the switching power supply apparatus in which such a setting is performed, it is possible to more efficiently provide switching control according to a preferred embodiment of the present invention.

In addition, in the switching power supply apparatus according to a preferred embodiment of the present invention, a current flowing through the transformer or the inductor in the power converter circuit or a current flowing through a switching element is detected, and the maximum value of the on-time is restricted.

In this configuration, in the switching control according to a preferred embodiment of the present invention, it is possible to prevent an overcurrent from flowing.

In addition, in the switching power supply apparatus according to a preferred embodiment of the present invention, the first switch circuit or the second switch circuit is preferably a field-effect transistor (FET), for example.

This configuration is an example in which FETs are provided as individual switch circuits. In addition, even in such a switching power supply apparatus, it is possible to provide the switching control according to a preferred embodiment of the present invention.

In addition, in the switching power supply apparatus according to a preferred embodiment of the present invention, the first switch circuit or the second switch circuit is preferably driven by a zero voltage switching operation in which, after voltages of both end portions of the switch circuit have been decreased to 0 V or the vicinity of 0 V, the switching element is turned on.

This configuration enables zero-voltage switching (ZVS) to be achieved. Accordingly, it is possible to efficiently prevent or minimize a loss occurring at the time of the turning on of the switching element.

In addition, in the switching power supply apparatus according to a preferred embodiment of the present invention, the first monitor signal generator is preferably a current transformer arranged to detect a current flowing through an inductor.

In addition, in the switching power supply apparatus according to a preferred embodiment of the present invention, the first monitor signal generator preferably utilizes the change of a drain-to-source voltage of at least one of the first switching element and the second switching element.

In addition, in the switching power supply apparatus according to a preferred embodiment of the present invention, the first monitor signal generator preferably utilizes the change of a drain-to-source current of at least one of the first switching element and the second switching element.

In addition, in the switching power supply apparatus according to a preferred embodiment of the present invention, the first monitor signal generator preferably utilizes the change of a voltage occurring between both end portions of the second primary winding.

These configurations are specific examples of configurations of the first monitor signal generator, and even using any one of the above-described configurations, it is possible to provide switching control according to a preferred embodiment of the present invention.

According to various preferred embodiments of the present invention, since switching is performed with an optimal dead time while a plurality of switching elements are not simultaneously turned on, a switching power supply apparatus having a high degree of reliability and a high degree of efficiency is obtained. Furthermore, since a switching frequency is constant or substantially constant, a noise due to the switching frequency is easily minimized and prevented, and a switching power supply apparatus having an excellent EMI characteristic is obtained. In addition, since the control operations are achieved using an analog IC that is readily available and inexpensive, a switching power supply apparatus having the above-described advantageous effects is inexpensively produced.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
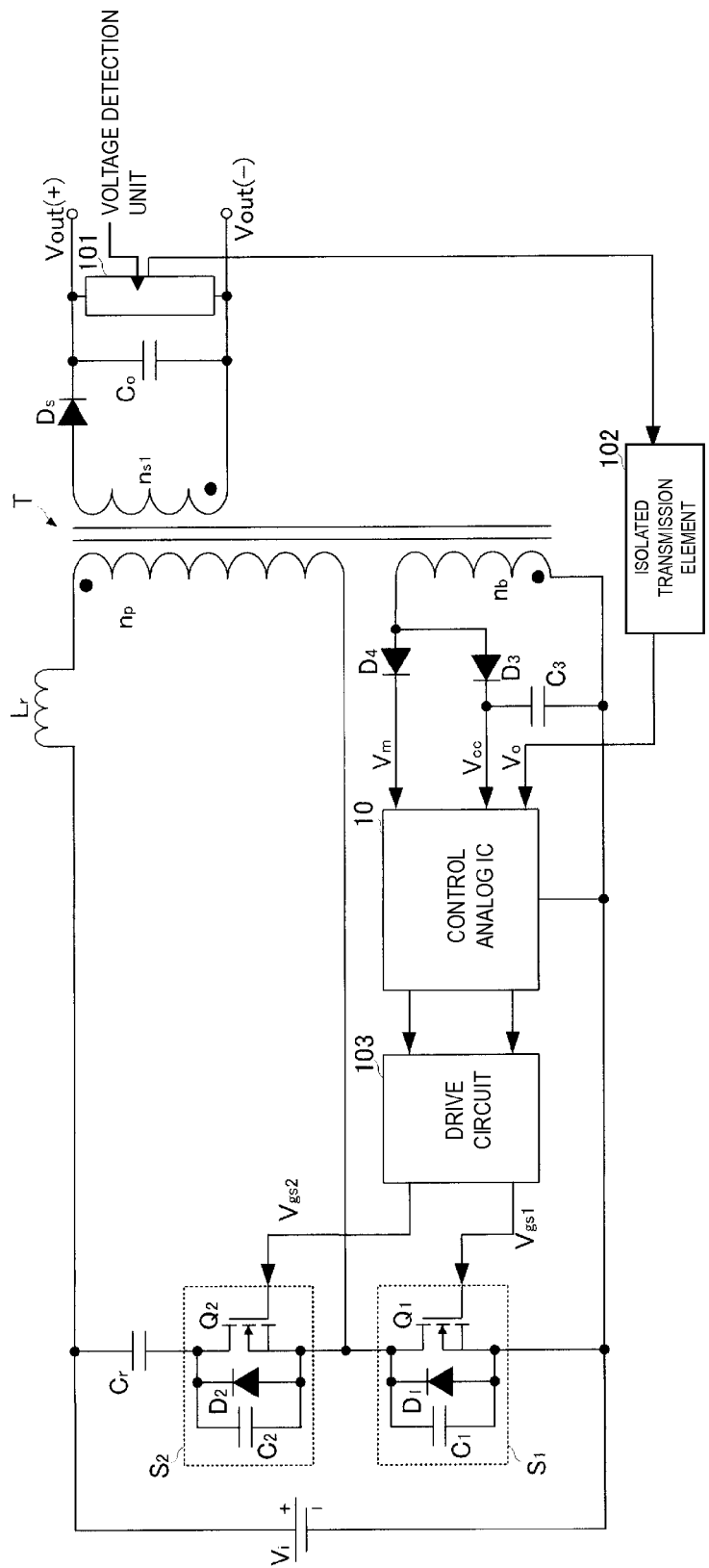
FIG. 1 is a circuit diagram of a switching power supply apparatus according to a first preferred embodiment of the present invention.

A switching power supply apparatus according to a first preferred embodiment of the present invention will be described with reference to drawings. FIG. 1 is the circuit diagram of the switching power supply apparatus according to the first preferred embodiment of the present invention.

Primary-Side Circuit Configuration of Transformer

An inductor Lr, a primary winding np of a transformer T, and a first switch circuit S1 are preferably connected in series to both end portions of an input power supply Vi, to which a direct-current input voltage is applied. The first switch circuit S1 includes a first switching element Q1, a diode D1, and a capacitor C1. The first switching element Q1 includes a FET, a drain terminal is connected to the primary winding np of the transformer T, and a source terminal is connected to the input power supply Vi. The diode D1 and the capacitor C1 are connected in parallel between the drain and the source of the first switching element Q1, and may be replaced with a parasitic diode and a parasitic capacitance of the first switching element Q1 that is preferably a FET, for example. The first switching element Q1 performs an on-off operation based on a first switching control signal Vgs1 supplied from a control analog IC 10 through a drive circuit 103.

In addition, a second switch circuit S2 and a capacitor Cr are connected so as to define a closed circuit with the primary winding np of the transformer T and the inductor Lr. The second switch circuit S2 includes a second switching element Q2 in which a FET, for example, is preferably included, a diode D2, and a capacitor C2. The drain terminal of the second switching element Q2 is connected to the capacitor Cr, and the source terminal thereof is connected to the primary winding np of the transformer T. The diode D2 and the capacitor C2 are connected in parallel between the drain and the source of the second switching element Q2, and may be replaced with a parasitic diode and a parasitic capacitance of the second switching element Q2 that is preferably a FET, for example. In the same or substantially the same manner as the first switching element Q1, the second switching element Q2 performs an on-off operation based on a second switching control signal Vgs2 supplied from the control analog IC 10 through the drive circuit 103.

In addition to the primary winding np, a bias winding nb is disposed on the primary side of the transformer T, and one end portion of the bias winding nb is connected to the input power supply Vi. The anode of a diode D3 is connected to the other end portion of the bias winding nb. A capacitor C3 is connected to the cathode of the diode D3. According to this configuration, a rectification smoothing circuit is defined by the diode D3 and the capacitor C3, and a driving voltage Vcc for the control analog IC 10 is supplied to the control analog IC 10.

In addition, the anode of a diode D4 is connected to the other end portion of this bias winding nb, and the cathode of the corresponding diode D4 is connected to the switch control analog IC 10, thereby supplying a monitor signal Vm to the control analog IC 10.

The control analog IC 10 is preferably defined by an analog circuit as illustrated in one of FIG. 2A, FIG. 3A, and FIG. 4A to FIG. 4D. The control analog IC 10 is driven using the driving voltage Vcc, and, based on the monitor signal Vm and a detection voltage signal Vo obtained from the secondary side circuit of the transformer T, generates the first switching control signal Vgs1 to drive the first switching element Q1 and the second switching control signal Vgs2 to drive the second switching element Q2.

For example, the drive circuit 103 may preferably include a high-side driver IC or other suitable drive circuit, for example, and inputs and boosts the first switching control signal Vgs1 and the second switching control signal Vgs2 into signals whose levels can drive at least the second switching element Q2. The drive circuit 103 outputs the first switching control signal Vgs1 to the first switching element Q1 and outputs the second switching control signal Vgs2 to the second switching element Q2.

Secondary-Side Circuit Configuration of Transformer

A secondary winding ns1 of the transformer T is preferably wound so as to have a reverse polarity with respect to the primary winding np, and both end portions of the secondary winding ns1 are voltage output terminals Vout(+) and Vout(−). The anode of a diode Ds is connected to one end portion on a voltage output terminal Vout(+) side of the secondary winding ns1, and the cathode of the diode Ds is connected to the voltage output terminal Vout(+). In addition, a capacitor Co is connected between both terminals of the voltage output terminals Vout(+) and Vout(−). In such a configuration, a rectification smoothing circuit including the diode Ds and the capacitor Co is provided.

In addition, a voltage detection unit 101 including a series resistance circuit and other suitable circuit elements is preferably connected between both terminals of the voltage output terminals Vout(+) and Vout(−), generates a detection voltage signal Vo according to an output voltage level between the voltage output terminals Vout(+) and Vout(−), and outputs the detection voltage signal Vo to isolated transmission element 102.

The isolated transmission element 102 preferably includes a photo coupler or other suitable element, for example, and transmits, to the control analog IC 10 on the primary side, the detection voltage signal Vo generated in the voltage detection unit 101 on the secondary side.

In such a configuration, an isolated-type switching power supply apparatus based on a flyback method is provided.

Specific Configuration of Switching Control Circuit

The control analog IC 10 is preferably an analog PWM control IC chip, for example. In addition, based on the monitor signal Vm and the detection voltage signal Vo, which are input, the control analog IC 10 generates the first switching control signal Vgs1 and the second switching control signal Vgs2 while maintaining a constant or substantially constant switching period Ts so that a desired output voltage level is obtained and the first switching element Q1 and the second switching element Q2 are not simultaneously turned on. The generated first switching control signal Vgs1 and second switching control signal Vgs2 are output to the drive circuit 103.

Figure 2A:
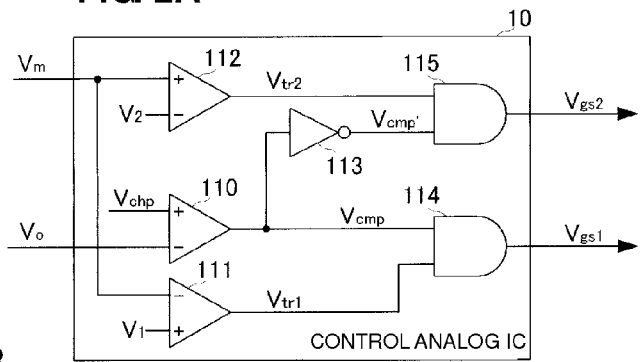
FIG. 2A includes a circuit diagram illustrating a configuration of an internal block of a control analog IC and FIG. 2B includes a waveform diagram illustrating a temporal relationship between individual signals.
Figure 2B:
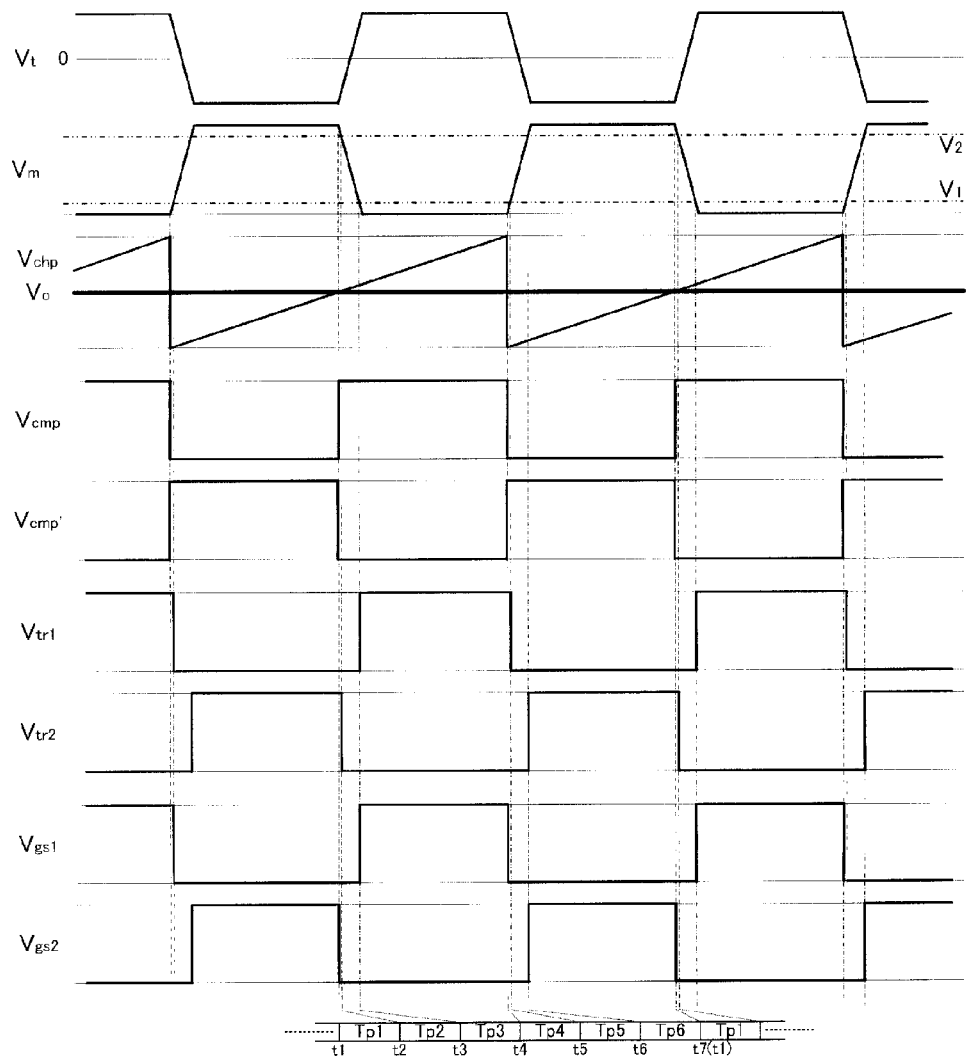

FIG. 2A is a circuit diagram illustrating the configuration of the internal block of the control analog IC 10 and FIG. 2B is a waveform diagram illustrating a temporal relationship between individual signals within the control analog IC 10.

The control analog IC 10 preferably includes comparators 110, 111, and 112, an inverter 113, and AND circuits 114 and 115.

The control analog IC 10 generates a saw-tooth wave signal Vchp whose period is a switching period Ts. This sawtooth wave signal Vchp includes a waveform whose level is gradually increased from a minimum level for the corresponding one period and reset to the minimum level at a time when the level has reached a maximum level in one period. In addition, the detection voltage signal Vo is set so as to be at a level located between the maximum level and the minimum level of the saw-tooth wave signal Vchp.

The control analog IC 10 synchronizes the reset timing of the saw-tooth wave signal Vchp with a predetermined timing. For example, as illustrated in FIG. 2B, the control analog C10 synchronizes the reset timing of the saw-tooth wave signal Vchp with a timing when the monitor signal Vm reaches a threshold value V2.

The comparator 110 inputs the saw-tooth wave signal Vchp and the detection voltage signal Vo. The comparator 110 outputs a first determination criterion signal Vcmp that is at a Hi level for a time period during which the level of the saw-tooth wave signal Vchp is higher than the level of the detection voltage signal Vo and is at a Low level for a time period during which the level of the saw-tooth wave signal Vchp is lower than the level of the detection voltage signal Vo.

The comparator 111 inputs the monitor signal Vm and a signal (hereinafter, referred to as a threshold value signal V1) corresponding to a threshold value level V1. The comparator 111 outputs a first switching judgment-use signal Vtr1 that is at a Hi level for a time period during which the level of the threshold value signal V1 is higher than the level of the monitor signal Vm and is at a Low level for a time period during which the level of the threshold value signal V1 is lower than the level of the monitor signal Vm.

The comparator 112 inputs the monitor signal Vm and a signal (hereinafter, referred to as a threshold value signal V2) corresponding to a threshold value level V2. The comparator 112 outputs a second switching judgment-use signal Vtr2 that is at a Hi level for a time period during which the level of the monitor signal Vm is higher than the level of the threshold value signal V2 and is at a Low level for a time period during which the level of the monitor signal Vm is lower than the level of the threshold value signal V2.

The inverter 113 subjects the first determination criterion signal Vcmp to reverse processing, and outputs a second determination criterion signal Vcmp'.

The AND circuit 114 inputs the first determination criterion signal Vcmp and the first switching judgment-use signal Vtr1, and outputs the first switching control signal Vgs1 that is at a Hi level for a time period during which the first determination criterion signal Vcmp and the first switching judgment-use signal Vtr1 are at Hi levels and is at a Low level for a time period other than that.

The AND circuit 115 inputs the second determination criterion signal Vcmp' and the second switching judgment-use signal Vtr2, and outputs the second switching control signal Vgs2 that is at a Hi level for a time period during which the second determination criterion signal Vcmp' and the second switching judgment-use signal Vtr2 are of Hi levels and is of a Low level for a time period other than that.

According to such processing, individual signals have a temporal relationship between waveforms illustrated in FIG. 2B.

In addition, while control described later is repeatedly performed with the switching period Ts specified by the saw-tooth wave signal Vchp, for convenience of description, control processing for a specific time period (in the following description, one period of the switching period Ts from a timing t0 at which the saw-tooth wave signal Vchp is reset) will be described.

(1) State 1 [Time Period Tp1: Timing t0 to t1]

As illustrated with respect to the timing t0 in FIG. 2B, when, with respect to the level of the detection voltage signal Vo, the level of the saw-tooth wave signal Vchp transitions from a minimum level side to a maximum level side with zero crossing, the first determination criterion signal Vcmp output from the comparator 110 transitions from the Low level to the Hi level. In addition, the second determination criterion signal Vcmp' output through the comparator 110 and the inverter 113 transitions from the Hi level to the Low level. In response to this, the second switching control signal Vgs2 output from the AND circuit 115 transitions to the Low level. In this manner, when the second switching control signal Vgs2 is caused to transition to the Low level, the transformer voltage Vt increases and the monitor signal Vm decreases.

In addition, when the transformer voltage Vt increases, the monitor signal Vm decreases, and the level of the monitor signal Vm becomes less than the threshold value V2 as illustrated with respect to a timing t1 in FIG. 2B, the second switching judgment-use signal Vtr2 output from the comparator 112 also transitions to the Low level along with the former second switching control signal Vgs2.

(2) State 2 [Time Period Tp2: Timing t2 to t3]

Furthermore, when the transformer voltage Vt increases, the monitor signal Vm decreases, and the level of the monitor signal Vm becomes less than or equal to the threshold value V1 after a predetermined delay time, the first switching judgment-use signal Vtr1 output from the comparator 111 transitions to the Hi level as illustrated with respect to a timing t2 in FIG. 2B. In this manner, since both the first determination criterion signal Vcmp and the first switching judgment-use signal Vtr1 become Hi levels at the timing t2, the first switching control signal Vgs1 transitions from the Low level to the Hi level.

(3) State 3 [Time Period Tp3: Timing t3 to t4]

After a predetermined time has elapsed in a state in which the first switching control signal Vgs1 is maintained at the Hi level, when, as illustrated with respect to a timing t4 in FIG. 2, a timing arrives at which the saw-tooth wave signal Vchp is reset, the saw-tooth wave signal Vchp transitions from the maximum level to the minimum level. Therefore, the first determination criterion signal Vcmp output from the comparator 110 transitions from the Hi level to the Low level. In response to this, the first switching control signal Vgs1 output from the AND circuit 114 transitions to the Low level. In this manner, when the first switching control signal Vgs1 is caused to transition to the Low level, the transformer voltage Vt decreases and the monitor signal Vm increases. In addition, the second determination criterion signal Vcmp' output through the comparator 110 and the inverter 113 transitions from the Low level to the Hi level.

Here, a time during which the first switching control signal Vgs1 is maintained at the Hi level is determined based on the length of a time period during which the level of the saw-tooth wave signal Vchp is higher than the detection voltage signal Vo, using the above-described circuit configuration. Accordingly, it is possible to set the length of time during which the first switching control signal Vgs1 is maintained at the Hi level, in response to the level of the detection voltage signal Vo, namely, an output voltage level. Furthermore, since a timing at which the first switching control signal Vgs1 is caused to transition from the Hi level to the Low level is provided as the transition timing of the saw-tooth wave signal Vchp having a constant or substantially constant period.

(4) State 4 [Time Period Tp4: Timing t4 to t5]

When the transformer voltage Vt decreases, the monitor signal Vm increases, and the level of the monitor signal Vm becomes higher than the threshold value V1 as illustrated with respect to a timing t5 in FIGS. 2A and 2B, the first switching judgment-use signal Vtr1 output from the comparator 111 also transitions to the Low level along with the former first switching control signal Vgs1.

(5) State 5 [Time Period Tp5: Timing t5 to t6]

Furthermore, when the transformer voltage Vt decreases, the monitor signal Vm increases, and the level of the monitor signal Vm becomes greater than or equal to the threshold value V2 after a predetermined delay time, the second switching judgment-use signal Vtr2 output from the comparator 112 transitions to the Hi level as illustrated with respect to a timing t6 in FIG. 2. In this manner, since both the second determination criterion signal Vcmp' and the second switching judgment-use signal Vtr2 are at Hi levels at the timing t6, the second switching control signal Vgs2 transitions from the Low level to the Hi level.

(6) State 6 [Time Period Tp6: Timing t6 to t7 (t1)]

After a predetermined time has elapsed in a state in which the second switching control signal Vgs2 is maintained at the Hi level, when, as illustrated with respect to a timing t7 (t1) in FIG. 2B, a timing appears again at which the level of the saw-tooth wave signal Vchp transitions from the minimum level side to the maximum level side with zero crossing with respect to the level of the detection voltage signal Vo, the second determination criterion signal Vcmp' output through the comparator 110 and the inverter 113 transitions from the Hi level to the Low level. In response to this, the second switching control signal Vgs2 output from the AND circuit 115 transitions to the Low level. In this manner, when the second switching control signal Vgs2 is caused to transition to the Low level, the transformer voltage Vt increases and the monitor signal Vm decreases.

By performing such processing as described above, after a predetermined delay time from a timing at which the second switching control signal Vgs2 subjecting the second switching element Q2 to on-off control has transitioned to the Low level, the first switching control signal Vgs1 subjecting the first switching element Q1 to on-off control transitions to the Hi level. In addition, after a predetermined delay time from a timing at which the first switching control signal Vgs1 subjecting the first switching element Q1 to on-off control has transitioned to the Low level, the second switching control signal Vgs2 subjecting the second switching element Q2 to on-off control transitions to the Hi level. Accordingly, the first switching control signal Vgs1 and the second switching control signal Vgs2 are not simultaneously at Hi levels, and the first switching element Q1 and the second switching element Q2 are prevented from being simultaneously subjected to on control. At this time, switching is performed by setting the threshold values V1 and V2 using the signal level of the monitor signal Vm, and thus, it is possible to control the first switching control signal Vgs1 and the second switching control signal Vgs2 at an optimal timing that is suited to a load situation.

In addition, the threshold value V1 is set to an electrical potential equal or substantially equal to the Low level of the monitor signal Vm, and thus, at a timing at which the first switching control signal Vgs1 is supplied to the switching element Q1, the drain-to-source voltage of the switching element Q1 becomes "0" electrical potential or about "0" electrical potential, and it is possible to achieve zero-voltage switching (ZVS). In the same or substantially the same manner, contrary to the threshold value V1, the threshold value V2 is preferably set to an electrical potential equal or substantially equal to the Hi level of the monitor signal Vm, and thus, at a timing at which the second switching control signal Vgs2 is supplied to the switching element Q2, the drain-to-source voltage of the switching element Q2 becomes "0" electrical potential or about "0" electrical potential, and it is possible to achieve zero-voltage switching (ZVS).

Furthermore, since the timings at which the first switching control signal Vgs1 and the second switching control signal Vgs2 transition to the Low levels are specified by the saw-tooth wave signal Vchp set to the constant period Ts, the switching period Ts becomes constant. Accordingly, a noise due to the switching period Ts is effectively dealt with and a switching power supply apparatus having a low EMI is provided.

In addition, an analog IC is preferably used in the same or substantially the same manner as in the present preferred embodiment, and thus, it is not necessary to use a high-priced device, such as a digital IC including a DSP, an FPGA, or other suitable device, for example. Therefore, a switching power supply apparatus can be inexpensively produced in which the switching control according to a preferred embodiment of the present invention is performed.

Figure 5:
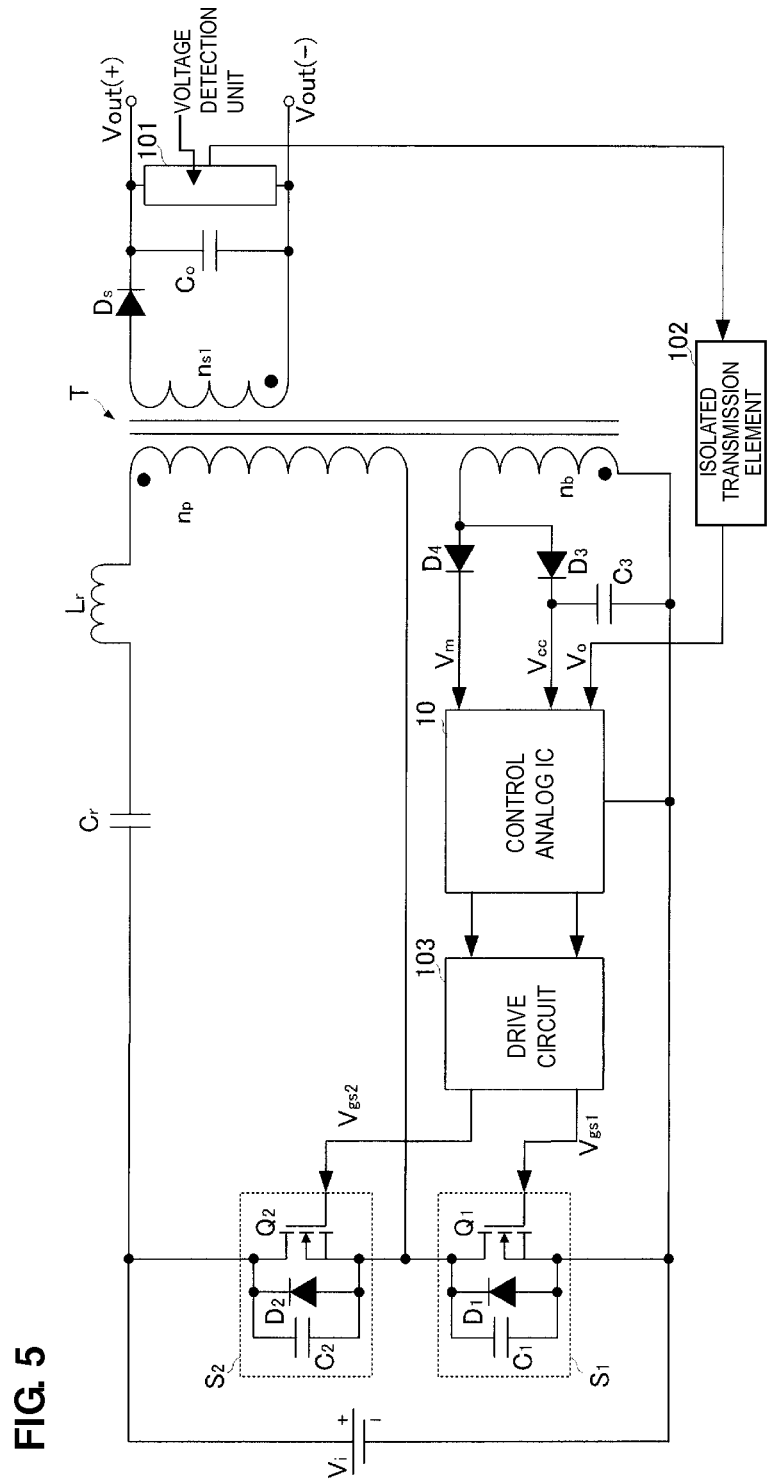
FIG. 5 is a circuit diagram of a switching power supply apparatus including another circuit configuration according to the first preferred embodiment of the present invention.

In addition, while, in the present preferred embodiment, a case has been described in which the capacitor Cr defining a closed circuit along with the primary winding np, the inductor L1, and the switch circuit S2 is connected in parallel to the input power supply Vi on the primary side of the transformer T, a circuit configuration may be provided in which the capacitor Cr is connected in series to the input power supply Vi, as illustrated in FIG. 5. FIG. 5 is the circuit diagram of a switching power supply apparatus including another circuit configuration according to the first preferred embodiment of the present invention. Even in such a configuration, it is possible to provide the switching control according to a preferred embodiment of the present invention, and it is possible to obtain the same or substantially the same functional effects.

In addition, the configuration of the control analog IC is an example, and the circuit configuration illustrated in FIGS. 3A and 3B or FIGS. 4A to 4D, or other suitable configurations, may alternatively be used. Furthermore, another similar circuit configuration based on these circuit configurations and a relationship between waveforms may be adopted.

Figure 3A:
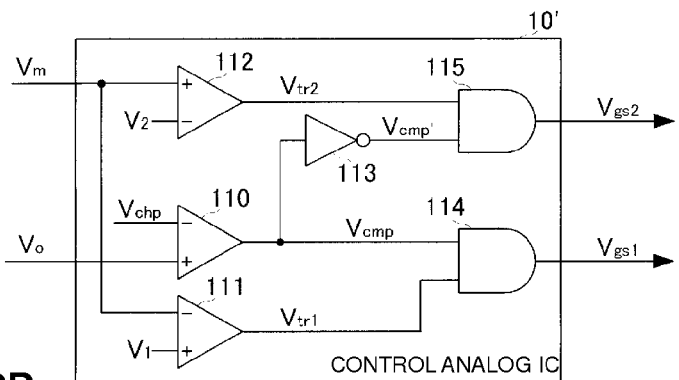
FIG. 3A includes a circuit diagram illustrating a configuration of an internal block of a control analog IC including another configuration and FIG. 3B includes a waveform diagram illustrating a temporal relationship between states of individual signals.
Figure 3B:
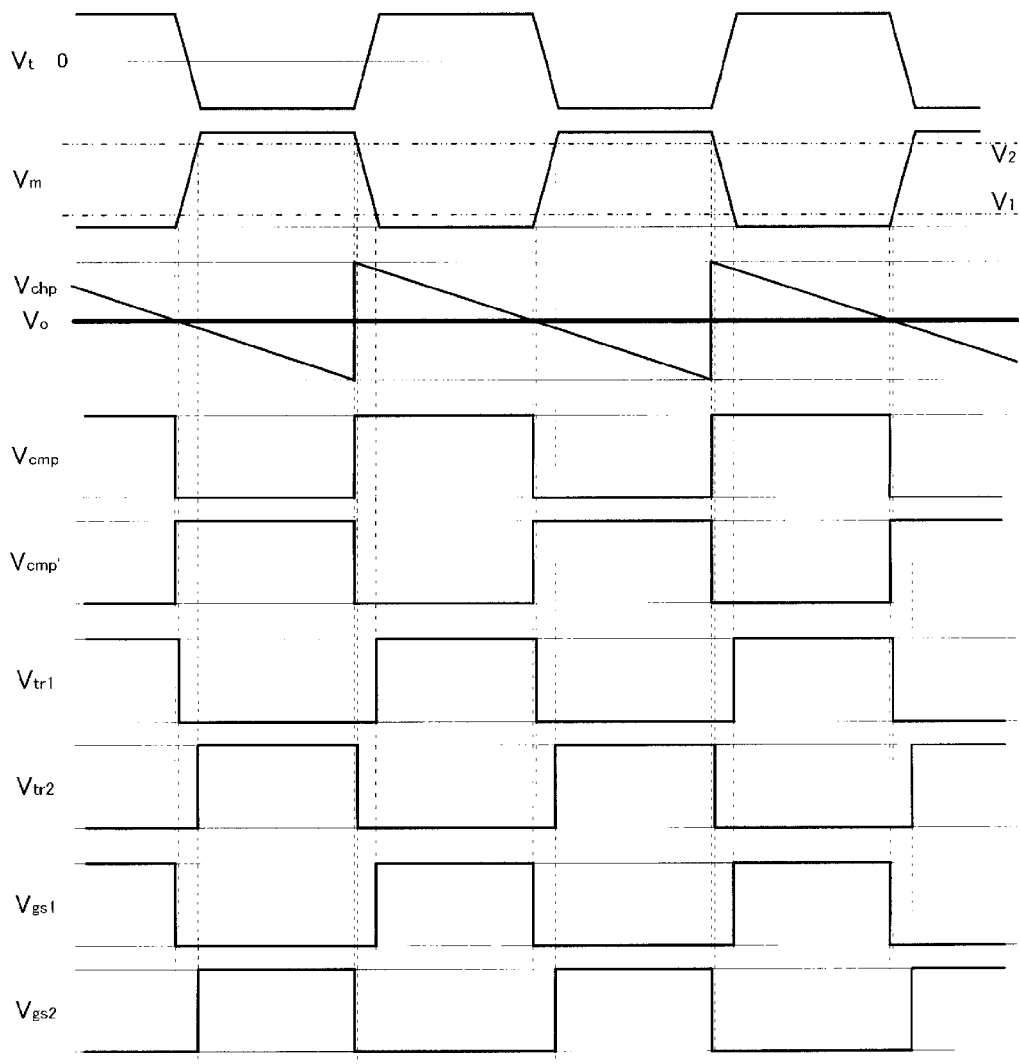

FIG. 3A is a circuit diagram illustrating the configuration of the internal block of a control analog IC 10' including another configuration and FIG. 3B is a waveform diagram illustrating a temporal relationship between individual signals within the control analog IC 10'. In addition, FIG. 4A to 4D are circuit diagrams illustrating configurations of internal blocks of control analogs IC 20, 30, 40, and 50 having other configurations.

In the control analog IC 10' illustrated in FIG. 3A, a saw-tooth wave signal Vchp preferably includes a waveform whose level is gradually decreased from a maximum level for one period and reset to transit to the maximum level at a time when the level has reached a minimum level after one period. In addition, a configuration is provided in which, with respect to the above-described comparator 110 in FIG. 2A, the inputs of the saw-tooth wave signal Vchp and the detection voltage signal Vo to the comparator 120 are preferably inverted. Even using such signals and a configuration, it is possible to obtain the same or substantially the same functional effects.

Figure 4A:
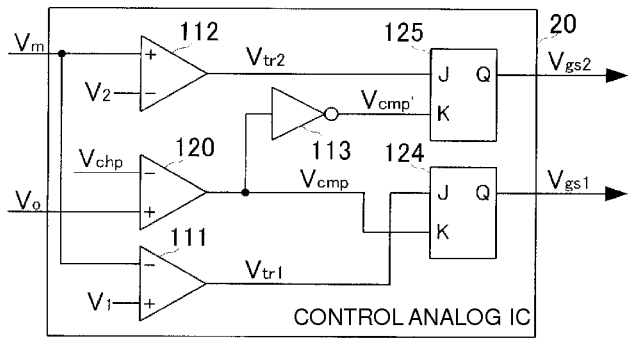
FIGS. 4A-4D includes circuit diagrams illustrating configurations of internal blocks of control analogs IC having other configurations.

In addition, the control analog IC 20 illustrated in FIG. 4A is a control analog IC in which flip-flop circuits 124 and 125 are preferably provided in place of the AND circuits 114 and 115 with respect to the control analog IC 10 illustrated in FIG. 2A. At this time, since a time period may occur in which input signals simultaneously have Hi levels, JK flip-flop circuits, for example, may preferably be provided as the flip-flop circuits 124 and 125.

Figure 4B:
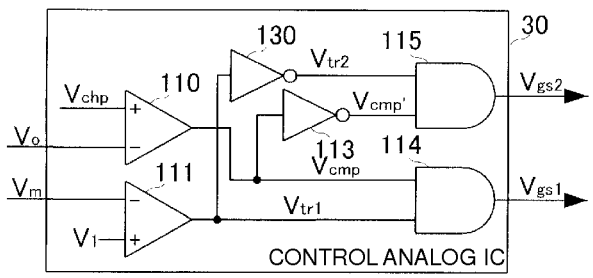

In addition, with respect to the control analog IC 10 illustrated in FIG. 2A, the control analog IC 30 illustrated in FIG. 4B preferably generates the second switching judgment-use signal Vtr2 without a comparator 112 and an inverter 130.

Figure 4C:
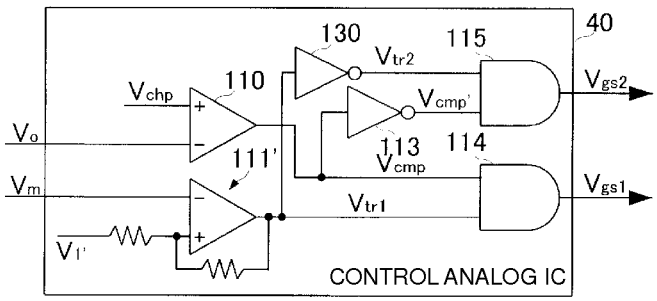

With respect to the control analog IC 20 illustrated in FIG. 4A, the control analog IC 40 illustrated in FIG. 4C preferably further includes a hysteresis comparator 111' in place of the comparator 111.

Figure 4D:
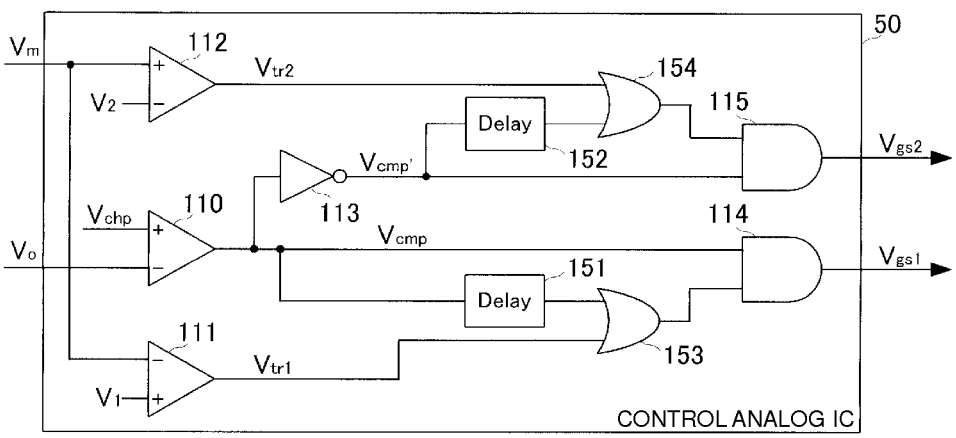

In the control analog IC 50 illustrated in FIG. 4D, an OR circuit 153 is preferably attached between the output of the comparator 111 and the input of the AND circuit 114. The first switching judgment-use signal Vtr1 from the comparator 111 is input to the OR circuit 153, and the first determination criterion signal Vcmp from the delay circuit 151, delayed by a predetermined time, is also input to the OR circuit 153. In addition, in the control analog IC 40, an OR circuit 154 is preferably attached between the output of the comparator 112 and the input of the AND circuit 115. The second switching judgment-use signal Vtr2 from the comparator 112 is input to the OR circuit 154, and the second determination criterion signal Vcmp' from the delay circuit 152, delayed by a predetermined time, is also input to the OR circuit 154. In such a configuration, even in a situation in which a sufficient level of the monitor signal Vm is not obtained from the bias winding nb at the time of activation along with the above-described functional effects, it is possible to output the first switching control signal Vgs1 and the second switching control signal Vgs2 using sufficient delay times set by the delay circuits 151 and 152.

Second Preferred Embodiment

Figure 6:
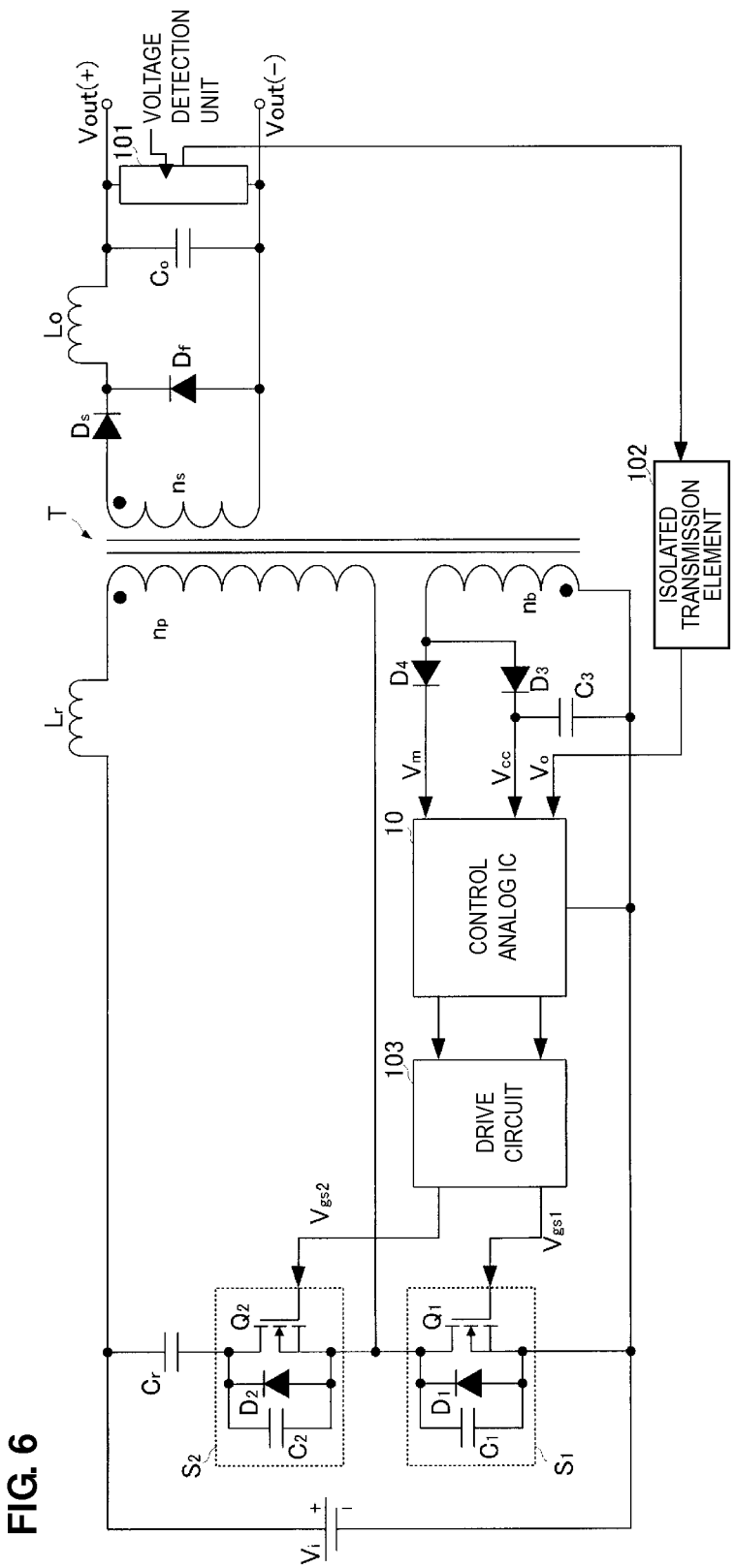
FIG. 6 is a circuit diagram of a switching power supply apparatus according to a second preferred embodiment of the present invention.

Next, a switching power supply apparatus according to a second preferred embodiment of the present invention will be described with reference to the drawings. FIG. 6 is the circuit diagram of the switching power supply apparatus according to the second preferred embodiment of the present invention.

As illustrated in FIG. 6, in the switching power supply apparatus according to the second preferred embodiment, the primary winding np and the secondary winding ns1 of the transformer T are preferably wound so as to have the same polarity. A circuit pattern on the primary side of the transformer T and the isolated transmission element 102 are the same or substantially the same as those in the switching power supply apparatus illustrated in FIG. 1, and a circuit pattern on a secondary side is different from that in the switching power supply apparatus illustrated in FIG. 1.

Preferably, the anode of the diode Ds is connected to one end portion of the secondary winding ns1 of the switching power supply apparatus according to the present preferred embodiment, and the cathode of the corresponding diode Ds is connected to the voltage output terminal Vout(+) through an inductor Lo. The other end portion of the secondary winding ns1 is connected to the voltage output terminal Vout(−).

In addition, a diode Df is preferably connected in parallel between both terminals of the secondary winding ns1. At this time, the cathode of the diode Df is connected to the inductor Lo that functions as a filter inductor.

In addition, the capacitor Co is connected between both terminals of the voltage output terminals Vout(+) and Vout(−). In such a configuration as described above, a rectification smoothing circuit defined by the diodes Ds and Df, the inductor Lo, and the capacitor Co is provided. In addition, a voltage detection unit 101 including a series resistance circuit and other suitable circuit elements is preferably connected between both terminals of the voltage output terminals Vout (+) and Vout(−), generates a detection voltage signal Vo according to an output voltage level between both terminals of the voltage output terminals Vout(+) and Vout(−), and outputs the detection voltage signal Vo to the isolated transmission element 102.

In such a configuration as described above, an isolated-type switching power supply apparatus that utilizes a forward method is provided. In addition, even in such a configuration, it is possible to provide the switching control according to the first preferred embodiment, and it is possible to obtain the same or substantially the same functional effects.

Third Preferred Embodiment

Figure 7:
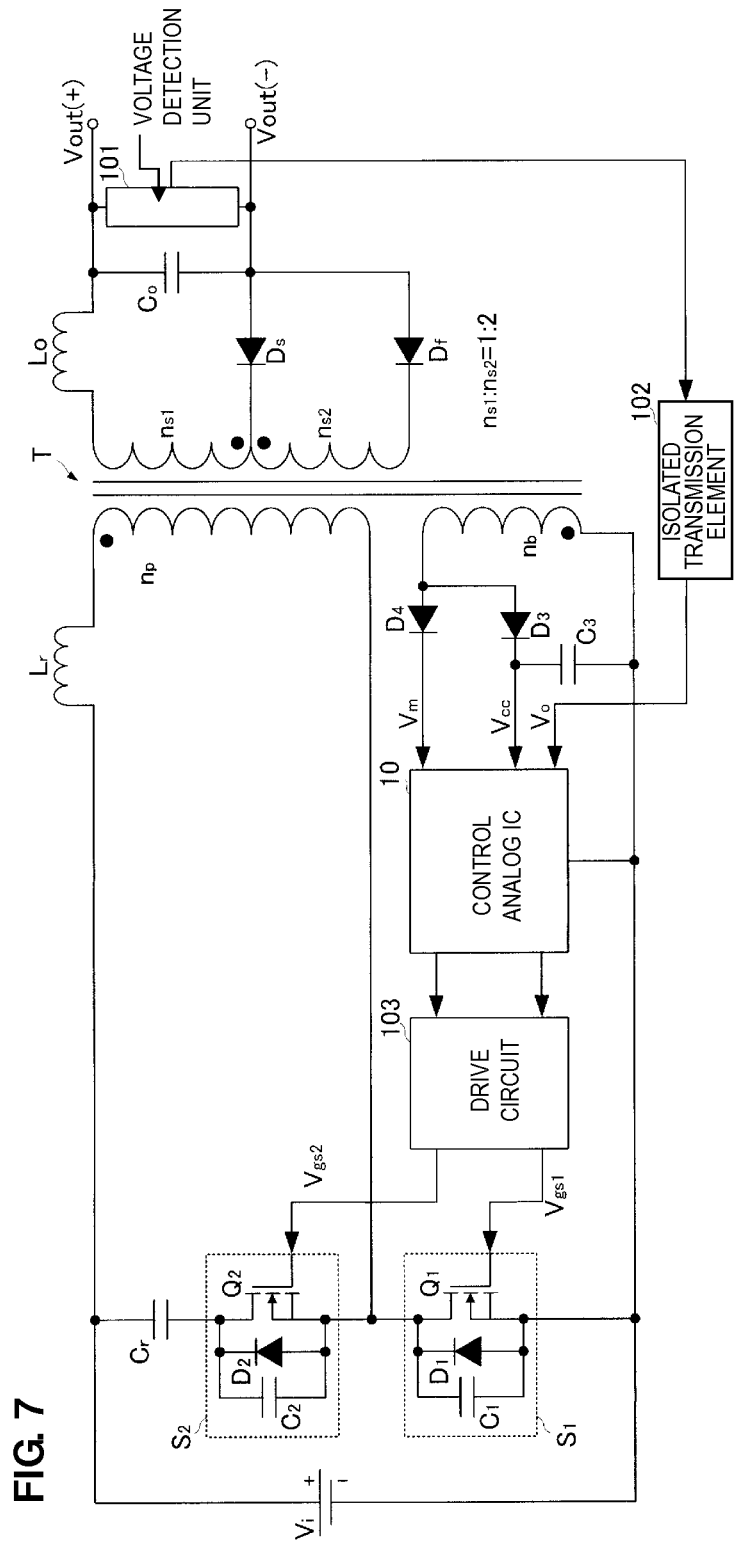
FIG. 7 is a circuit diagram of a switching power supply apparatus according to a third preferred embodiment of the present invention.

Next, a switching power supply apparatus according to a third preferred embodiment of the present invention will be described with reference to the drawings. FIG. 7 is the circuit diagram of the switching power supply apparatus according to the third preferred embodiment of the present invention.

As illustrated in FIG. 7, in the switching power supply apparatus according to the present preferred embodiment, preferably a circuit pattern on the primary side of the transformer T and the isolated transmission element 102 are the same or substantially the same as those in the above-described switching power supply apparatus illustrated in FIG. 1, and the transformer T and a circuit pattern on the secondary side thereof are different from those in the switching power supply apparatus illustrated in FIG. 1.

The transformer T is preferably a composite-type transformer, for example, in which two secondary windings ns1 and ns2 are disposed with respect to one primary winding np. The first secondary winding ns1 of the transformer T is wound with the polarity thereof being opposite to the primary winding np, and the second secondary winding ns2 is wound with the polarity thereof being the same as the primary winding np. The first secondary winding ns1 and the second secondary winding ns2 are preferably configured so that a winding ratio between the first secondary winding ns1 and the second secondary winding ns2 is ns1:ns2=1:2, for example.

The voltage output terminal Vout(+) is connected to one end portion of the first secondary winding ns1 through the inductor Lo. The cathode of the diode Ds is connected to the other end portion of the first secondary winding ns1, and the anode of the corresponding diode Ds is connected to the voltage output terminal Vout(−).

One end portion of the second secondary winding ns2 is connected to the other end portion of the first secondary winding ns1. The cathode of the diode Df is connected to one end portion of the second secondary winding ns2, and the anode of the corresponding diode Df is also connected to the voltage output terminal Vout(−).

In addition, a capacitor Co is preferably connected between both terminals of the voltage output terminals Vout(+) and Vout(−). In such a configuration as described above, a rectification smoothing circuit including the diodes Ds and Df, the inductor Lo, and the capacitor Co is provided. In addition, a voltage detection unit 101 including a series resistance circuit and other suitable circuit elements is preferably connected between both terminals of the voltage output terminals Vout (+) and Vout(−), generates a detection voltage signal Vo according to an output voltage level between both terminals of the voltage output terminals Vout(+) and Vout(−), and outputs the detection voltage signal Vo to the isolated transmission element 102.

In the switching power supply apparatus having such a configuration, for a time period when the first switch circuit S1 is turned on and the second switch circuit S2 is turned off, a current flows through a loop including the voltage output terminal Vout(−)→the diode Df→the second secondary winding ns2→the first secondary winding ns1→the inductor Lo→the voltage output terminal Vout(+), and for a time period when the first switch circuit S1 is turned off and the second switch circuit S2 is turned on, a current flows through a loop including the voltage output terminal Vout(−)→the diode Ds→the first secondary winding ns1→the inductor Lo→the voltage output terminal Vout(+). Therefore, for any one of the on-period of the first switch circuit S1 (the off-period of the second switch circuit S2) and the off-period of the first switch circuit S1 (the on-period of the second switch circuit S2), it is possible to perform energy transmission from the primary side of the transformer T to the secondary side thereof. Namely, it is possible to practically perform energy transmission from the primary side of the transformer T to the secondary side thereof over substantially the entire time period of the switching period Ts.

Here, while energy transmission is not performed for a time period for which the switching element is switched, it is possible to very efficiently perform energy transmission over substantially the entire time period of the switching period Ts, by applying the switching control described above.

Furthermore, as illustrated in the present preferred embodiment, by setting the winding ratio between the first secondary winding ns1 and the second secondary winding ns2 to be ns1:ns2=1:2, it is possible to obtain a same output voltage level for any one of the on-period of the first switch circuit S1 (the off-period of the second switch circuit S2) and the off-period of the first switch circuit S1 (the on-period of the second switch circuit S2). Accordingly, it is possible to prevent or minimize a ripple component of the output voltage.

Figure 8:
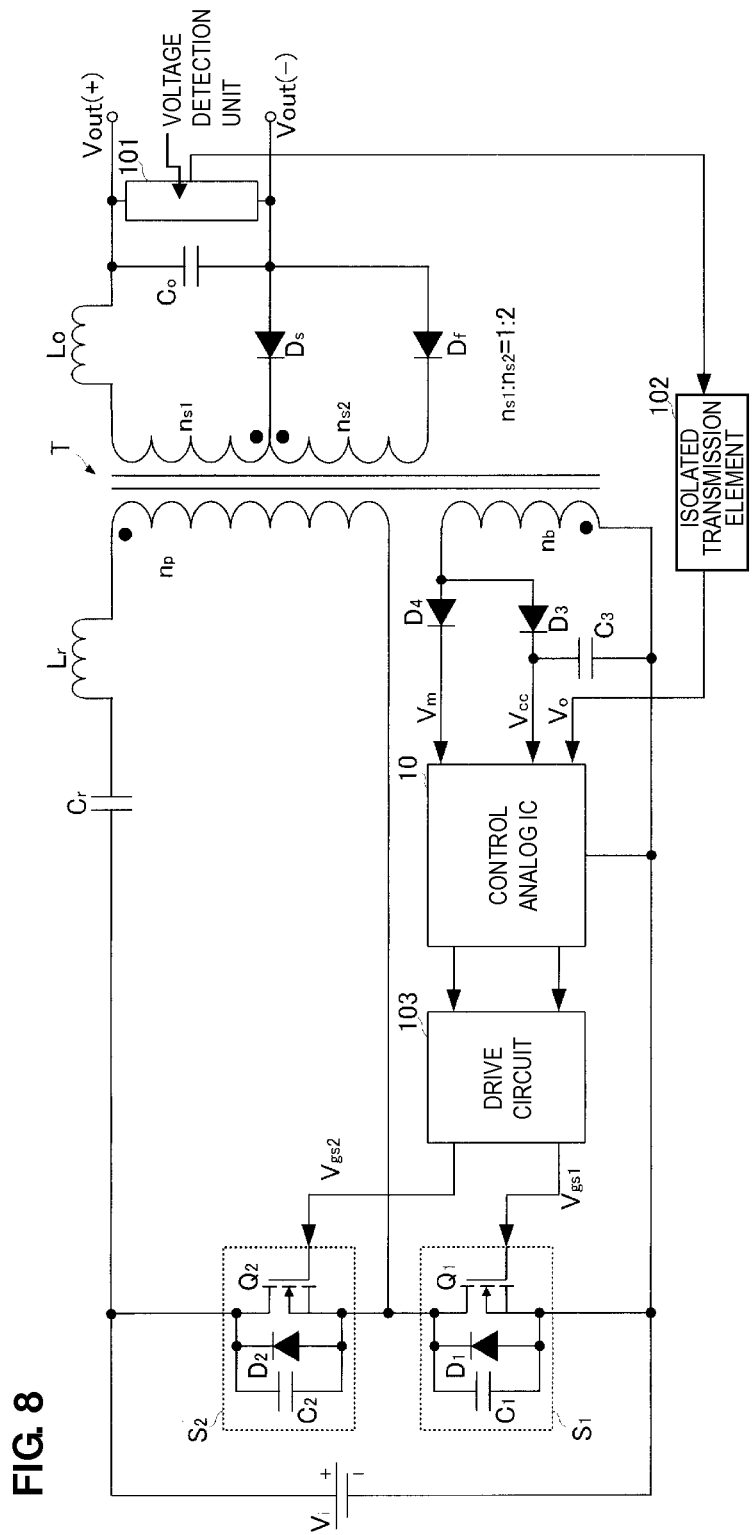
FIG. 8 is a circuit diagram of a switching power supply apparatus including another circuit configuration according to the third preferred embodiment of the present invention.
Figure 9:
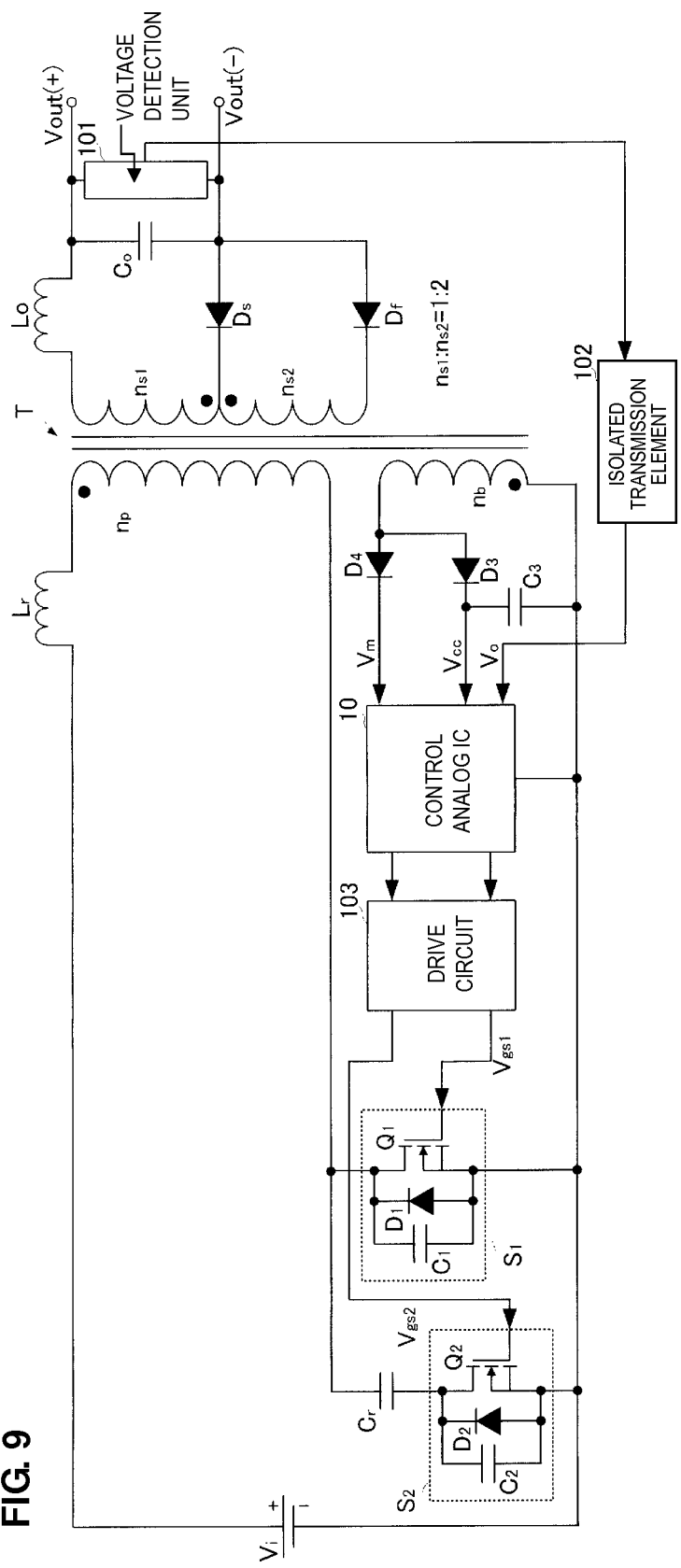
FIG. 9 is a circuit diagram of a switching power supply apparatus including another circuit configuration according to the third preferred embodiment of the present invention.

In addition, while, in the switching power supply apparatus shown in FIG. 7, a case has been illustrated in which the capacitor Cr defining a closed circuit along with the primary winding np, the inductor L1, and the switch circuit S2 is preferably connected in parallel to the input power supply Vi on the primary side of the transformer T, a circuit configuration may be provided in which the capacitor Cr is connected in series to the input power supply Vi, as illustrated in FIG. 8. FIG. 8 is the circuit diagram of a switching power supply apparatus including another circuit configuration according to the third preferred embodiment. In addition, as illustrated in FIG. 9, a circuit configuration may be provided in which a series circuit including the second switch circuit S2 and the capacitor Cr is connected in parallel to the first switch circuit S1. FIG. 9 is the circuit diagram of a switching power supply apparatus including another circuit configuration according to the third preferred embodiment. Even in such configurations, it is possible to provide the switching control according to a preferred embodiment of the present invention, and it is possible to obtain the same or substantially the same functional effects.

Fourth Preferred Embodiment

Figure 10:
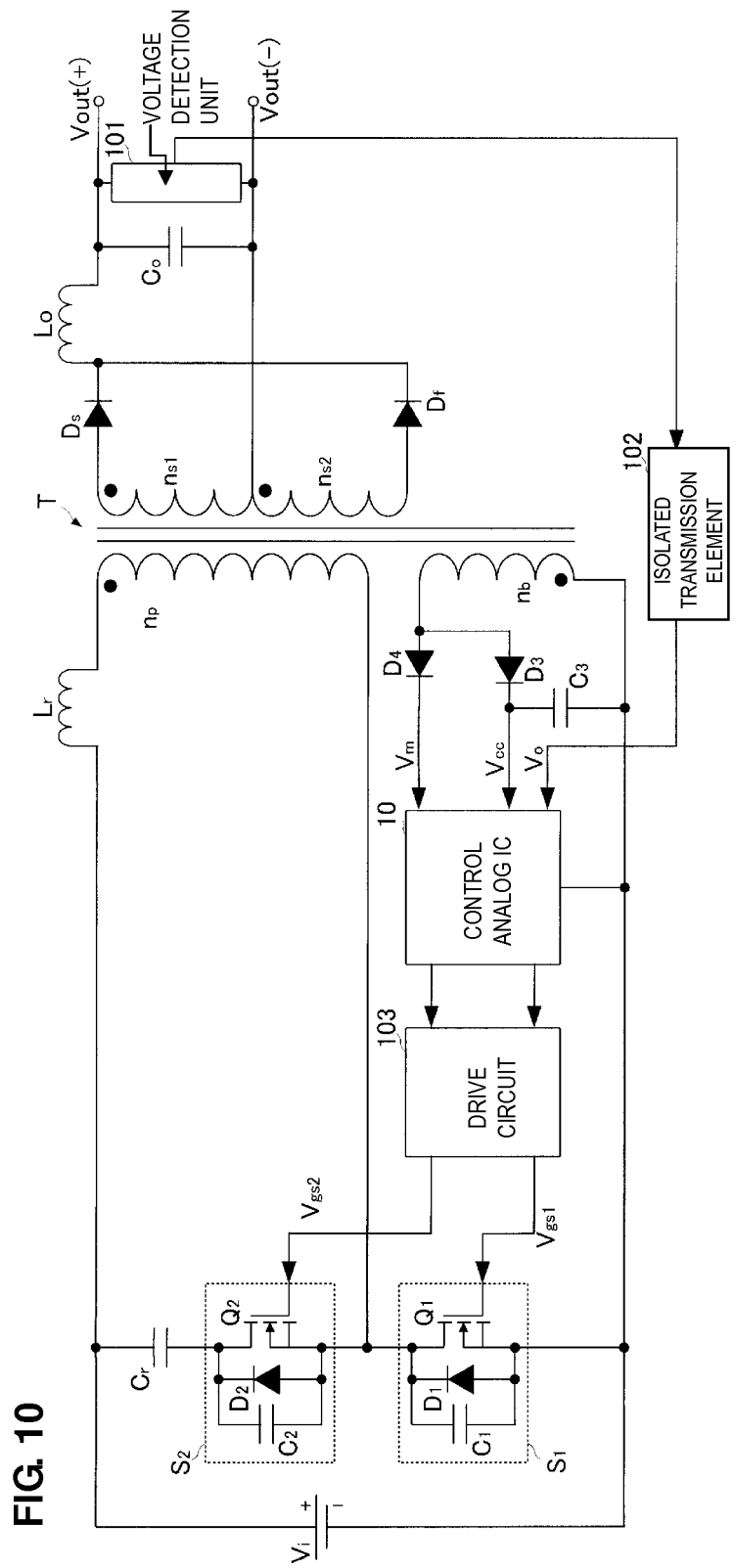
FIG. 10 is a circuit diagram of a switching power supply apparatus according to a fourth preferred embodiment of the present invention.

Next, a switching power supply apparatus according to a fourth preferred embodiment of the present invention will be described with reference to the drawings. FIG. 10 is the circuit diagram of a switching power supply apparatus according to the fourth preferred embodiment of the present invention.

As illustrated in FIG. 10, in the switching power supply apparatus according to the present preferred embodiment, preferably, a circuit pattern on the primary side of the transformer T and the isolated transmission element 102 are the same or substantially the same as those in the above-described switching power supply apparatus illustrated in FIG. 1, and the transformer T and a circuit pattern on a secondary side are different from those in the switching power supply apparatus illustrated in FIG. 1.

The transformer T is preferably a composite-type transformer in which two secondary windings ns1 and ns2 are disposed with respect to one primary winding np. The first secondary winding ns1 of the transformer T is wound with the polarity thereof being the same as the primary winding np, and the second secondary winding ns2 is also wound with the polarity thereof being the same as the primary winding np.

The anode of the diode Ds is connected to one end portion of the first secondary winding ns1, and the cathode of the corresponding diode Ds is connected to the voltage output terminal Vout(+) through the inductor Lo. The other end portion of the first secondary winding ns1 is connected to the voltage output terminal Vout(−).

One end portion of the second secondary winding ns2 is connected to the other end portion of the first secondary winding ns1. The cathode of the diode Df is connected to the other end portion of the second secondary winding ns2, and the anode of the corresponding diode Df is also connected to the voltage output terminal Vout(+) through the inductor Lo.

In addition, a capacitor Co is connected between both terminals of the voltage output terminals Vout(+) and Vout(−). In such a configuration as described above, a rectification smoothing circuit defined by the diodes Ds and Df, the inductor Lo, and the capacitor Co is provided. In addition, a voltage detection unit 101 including a series resistance circuit and other suitable circuit elements is preferably connected between both terminals of the voltage output terminals Vout (+) and Vout(−), generates a detection voltage signal Vo according to an output voltage level between both terminals of the voltage output terminals Vout(+) and Vout(−), and outputs the detection voltage signal Vo to the isolated transmission element 102.

In such a configuration, it is possible to configure a switching power supply apparatus that utilizes a center tap-type full-wave rectifier circuit. In addition, even in such a configuration, it is possible to provide the switching control according to the first preferred embodiment, and it is possible to obtain the same or substantially the same functional effects.

Figure 11:
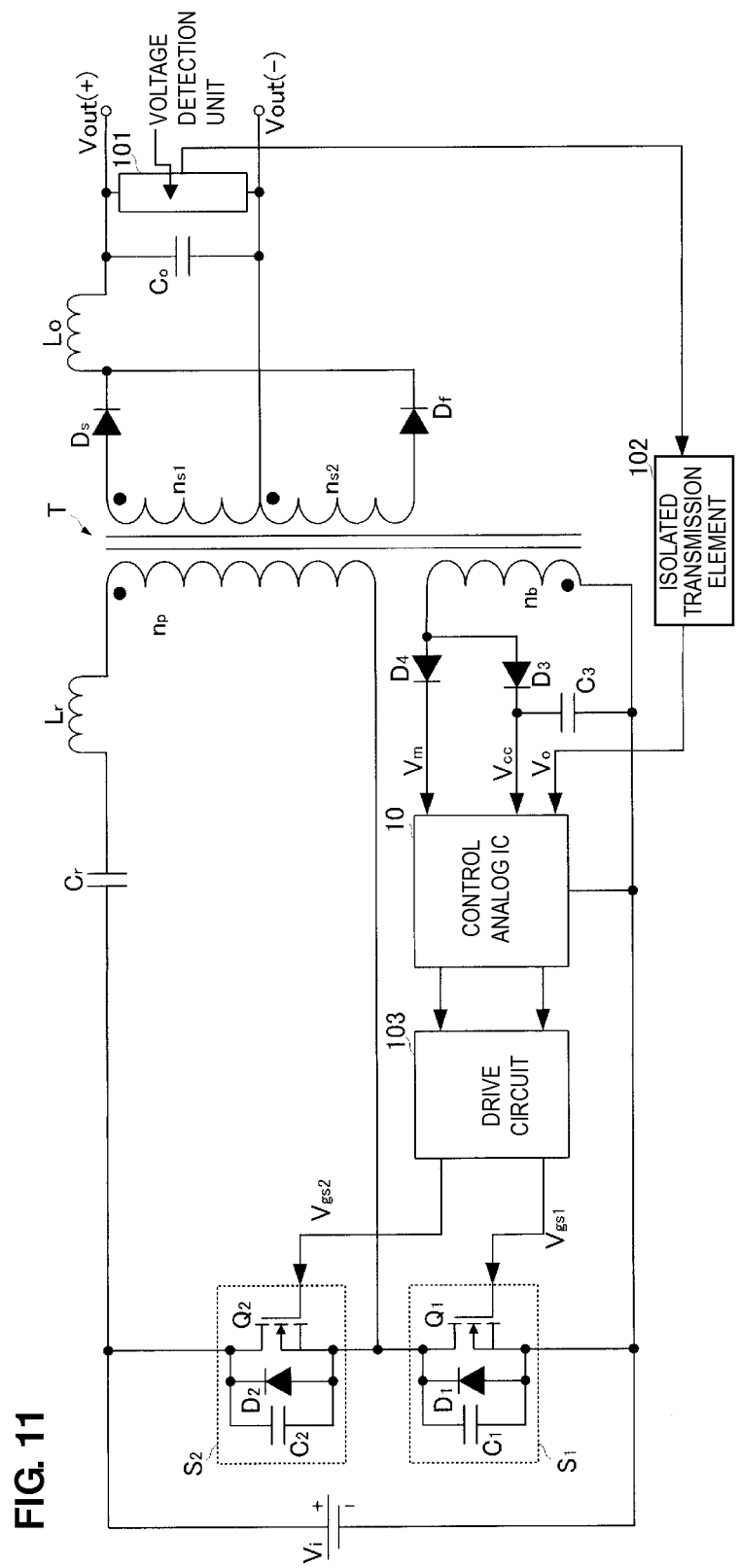
FIG. 11 is a circuit diagram of a switching power supply apparatus including another circuit configuration according to the fourth preferred embodiment of the present invention.
Figure 12:
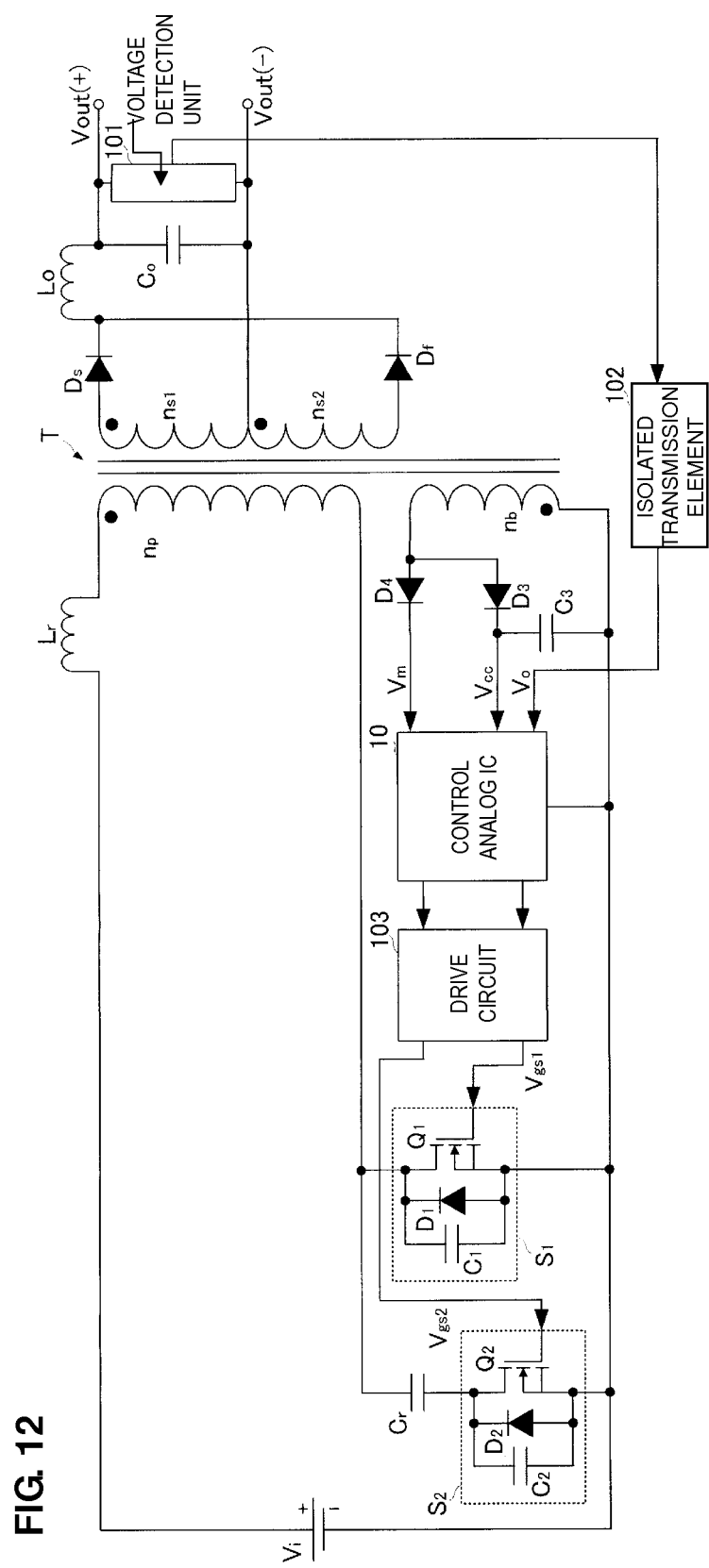
FIG. 12 is a circuit diagram of a switching power supply apparatus including another circuit configuration according to the fourth preferred embodiment of the present invention.

In addition, while, in the switching power supply apparatus according to the present preferred embodiment shown in FIG. 10, a case has been illustrated in which the capacitor Cr defining a closed circuit along with the primary winding np, the inductor L1, and the switch circuit S2 is preferably connected in parallel to the input power supply Vi on the primary side of the transformer T, a circuit configuration may be provided in which the capacitor Cr is connected in series to the input power supply Vi, as illustrated in FIG. 11. FIG. 11 is the circuit diagram of a switching power supply apparatus including another circuit configuration according to the fourth preferred embodiment. In addition, as illustrated in FIG. 12, a circuit configuration may be provided in which a series circuit including the second switch circuit S2 and the capacitor Cr is connected in parallel to the first switch circuit S1. FIG. 12 is the circuit diagram of a switching power supply including another circuit configuration according to the fourth preferred embodiment. Even in such a configuration, it is possible to provide the switching control according to a preferred embodiment of the present invention, and it is possible to obtain the same or substantially the same functional effects.

Fifth Preferred Embodiment

Figure 13:
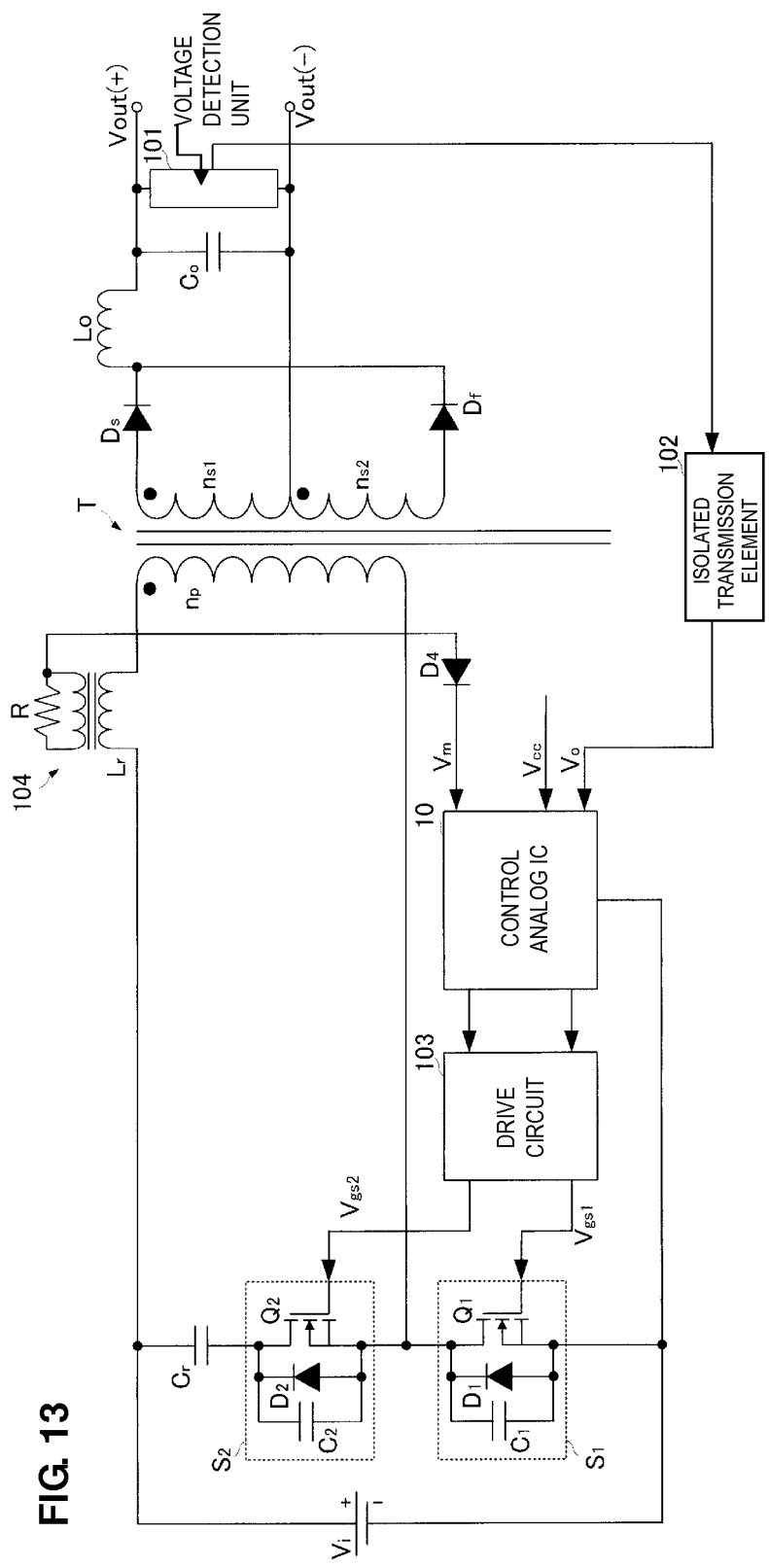
FIG. 13 is a circuit diagram of a switching power supply apparatus according to a fifth preferred embodiment of the present invention.

Next, a switching power supply apparatus according to a fifth preferred embodiment of the present invention will be described with reference to the drawings. FIG. 13 is the circuit diagram of a switching power supply apparatus according to the fifth preferred embodiment of the present invention.

As illustrated in FIG. 13, in the switching power supply apparatus according to the present preferred embodiment, preferably, the transformer T, a circuit pattern on the secondary side of the transformer T, and the isolated transmission element 102 are the same or substantially the same as those in the switching power supply apparatus illustrated in FIG. 10 according to the fourth preferred embodiment, and a configuration is included in which the bias winding nb on the primary side is preferably not provided.

In the switching power supply apparatus according to the present preferred embodiment, a current transformer circuit 104 is provided which includes a primary winding that is preferably defined by the inductor Lr connected in series to the primary winding np. A resistance element R is preferably connected to the secondary winding of the current transformer circuit 104, and one end portion of the corresponding resistance element R is connected to the anode of the diode D3. In addition, the cathode of the corresponding diode D3 is connected to the switch control analog IC 10, and hence the monitor signal Vm is supplied to the control analog IC 10.

In such a configuration, it is possible to generate a monitor signal based on the change of magnetic flux due to a current flowing through the primary winding np of the transformer T. In addition, since such a configuration is provided, by supplying the driving voltage Vcc of the control analog IC 10 from the outside, it is possible to perform such switching control according to a preferred embodiment of the present invention even in a configuration in which no bias winding nb is provided. In addition, while, in FIG. 13, a case has been illustrated in which the switching power supply apparatus preferably includes the full-wave rectifier circuit based on the center tap method, it is possible to provide a configuration, in which the current transformer circuit of the present preferred embodiment is used, even to a switching power supply apparatus based on another method according to any one of the preferred embodiments of the present invention described above.

Sixth Preferred Embodiment

Figure 14:
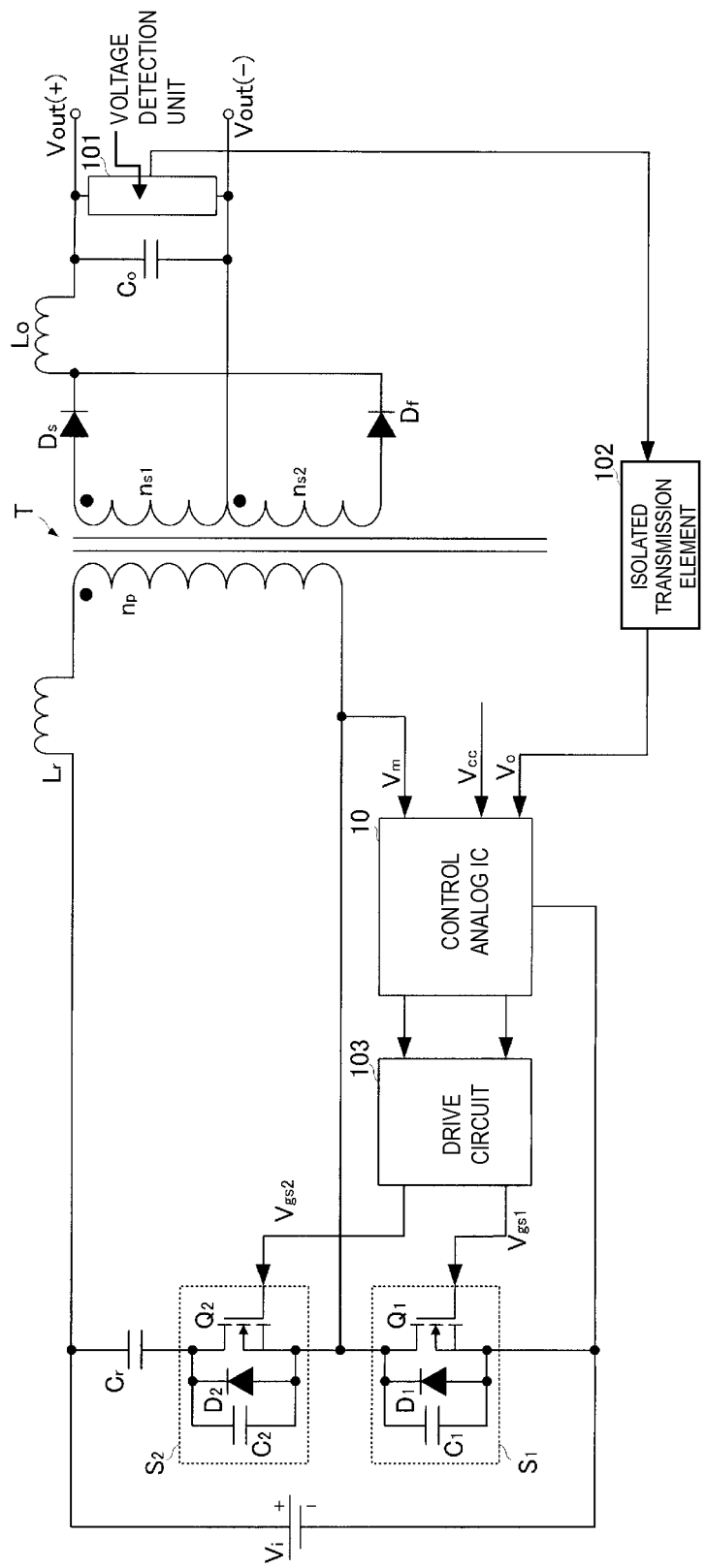
FIG. 14 is a circuit diagram of a switching power supply apparatus according to a sixth preferred embodiment of the present invention.

Next, a switching power supply apparatus according to a sixth preferred embodiment of the present invention will be described with reference to the drawings. FIG. 14 is the circuit diagram of a switching power supply apparatus according to the sixth preferred embodiment of the present invention.

As illustrated in FIG. 14, in the switching power supply apparatus according to the present preferred embodiment, preferably, the transformer T, a circuit pattern on the secondary side of the transformer T, and the isolated transmission element 102 are the same or substantially the same as those in the switching power supply apparatus including a configuration in which the bias winding nb on the primary side is not provided, as in the fifth preferred embodiment.

Furthermore, the switching power supply apparatus of the present preferred embodiment preferably does not include the current transformer circuit illustrated in FIG. 13 in the fifth preferred embodiment. Therefore, the switching power supply apparatus of the present preferred embodiment obtains the monitor signal Vm from one end portion of the primary winding np through a resistor voltage-dividing circuit not illustrated.

Even in such a configuration, when the driving voltage Vcc of the control analog IC 10 can be supplied from the outside, it is possible to perform switching control as in the fifth preferred embodiment, using no bias winding nb. In addition, while, in FIG. 14, a case has been illustrated in which the switching power supply apparatus preferably includes the full-wave rectifier circuit based on the center tap method, it is possible to provide the configuration of the present preferred embodiment even to a switching power supply apparatus based on another method disclosed in the preferred embodiments described above.

Seventh Preferred Embodiment

Figure 15:
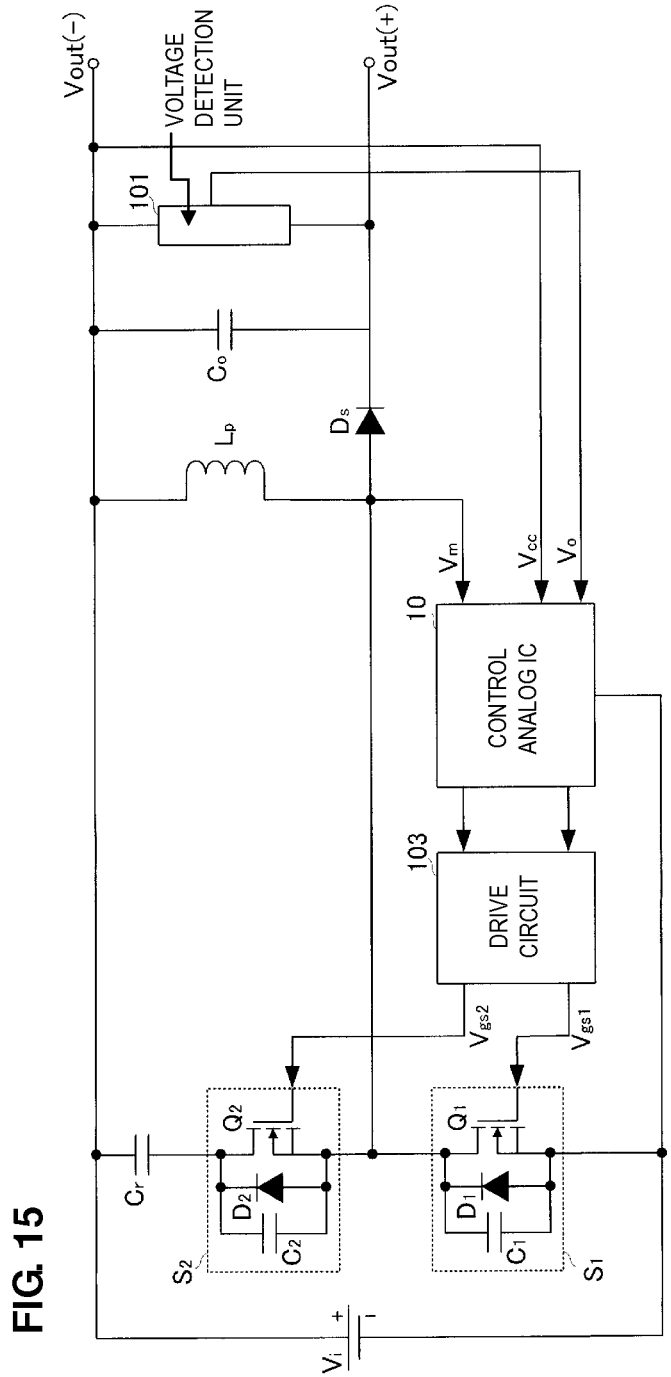
FIG. 15 is a circuit diagram of a switching power supply apparatus according to a seventh preferred embodiment of the present invention.

Next, a switching power supply apparatus according to a seventh preferred embodiment of the present invention will be described with reference to the drawings. FIG. 15 is the circuit diagram of a switching power supply apparatus according to the seventh preferred embodiment of the present invention.

While, in each of the above-described preferred embodiments, the isolated-type switching power supply apparatus utilizing the transformer T has been illustrated as an example, in the present preferred embodiment, a case in which the switching control is applied to an non-isolated-type converter will be described as another example.

Preferably, the voltage output terminal Vout(−) is connected to one end portion (Vi(+)) of the input power supply Vi, to which the direct-current input voltage is applied. The other end portion (Vi(−)) of the input power supply Vi is connected to the voltage output terminal Vout(+) through a series circuit including the first switch circuit Q1 and the diode Ds.

An inductor Lp is connected on an input power supply Vi side with respect to the diode Ds between both terminals of the voltage output terminals Vout(+) and Vout(−), and furthermore, the capacitor Co is connected on voltage output terminals Vout(+) and Vout(−) sides with respect to the diode Ds. In addition, a series circuit including the capacitor Cr and the second switch circuit S2 is preferably connected in parallel to the inductor Lp on an input power supply Vi side of the inductor Lp.

The first switch circuit S1 includes the first switching element Q1 preferably including a FET, for example, the diode D1, and the capacitor C1. The diode D1 and the capacitor C1 are connected in parallel between the drain and the source of the first switching element Q1, and may be replaced with a parasitic diode and a parasitic capacitance of the first switching element Q1 that is preferably a FET, for example. The first switching element Q1 performs an on-off operation based on the first switching control signal Vgs1 supplied from the control analog IC 10 through the drive circuit 103.

The second switch circuit S2 includes the second switching element Q2 preferably including a FET, for example, the capacitor C2, and the diode D2. The diode D2 and the capacitor C2 are connected in parallel between the drain and the source of the second switching element Q2, and may be replaced with a parasitic diode and a parasitic capacitance of the second switching element Q2 that is preferably a FET, for example. The second switching element Q2 performs an on-off operation based on the second switching control signal Vgs2 supplied from the control analog IC 10 through the drive circuit 103.

In addition, the voltage detection unit 101 including a series resistance circuit and other circuit elements is preferably connected between both terminals of the voltage output terminals Vout(+) and Vout(−). The voltage detection unit 101 generates the detection voltage signal Vo according to an output voltage level between both terminals of the voltage output terminals Vout(+) and Vout(−), and supplies the detection voltage signal Vo to the control analog IC 10.

In addition, the output voltage between the voltage output terminals Vout(+) and Vout(−) is supplied to the control analog IC 10, as the driving voltage Vcc of the control analog IC 10.

As illustrated in the above-described preferred embodiment, the control analog IC 10 is driven using the driving voltage Vcc, and, based on the monitor signal Vm and the detection voltage signal Vo from the voltage detection unit 101, generates the first switching control signal Vgs1 and the second switching control signal Vgs2 so that the output voltage is controlled to become a predetermined voltage level.

The drive circuit 103 inputs and boosts the first switching control signal Vgs1 and the second switching control signal Vgs2 into signals whose levels can drive at least the second switching element Q2. The drive circuit 103 outputs the first switching control signal Vgs1 to the first switching element Q1 and outputs the second switching control signal Vgs2 to the second switching element Q2.

By using such a configuration, it is possible to configure a non-isolated-type buck-boost converter that is called a polarity-reversed chopper circuit and in which the first switching element Q1 of the first switch circuit S1 is provided as a control-use switching element and the second switching element Q2 of the second switch circuit S2 and the capacitor Cr define a clamp circuit. In addition, even in such a configuration, using the above-described switching control, it is possible to provide a non-isolated-type buck-boost converter that has a high degree of reliability and a high degree of efficiency.

In addition, in the same or substantially the same manner as the above-described isolated type switching power supply apparatuses, even such a non-isolated type as in the present preferred embodiment may be applied to a structure in which the capacitor Cr connected in series to the second switch circuit S2 is connected in series to the input power supply Vi and the inductor Lp, or a structure in which the series circuit including the second switch circuit S2 and the capacitor Cr is connected in parallel to the first switch circuit S1.

Eighth Preferred Embodiment

Figure 16:
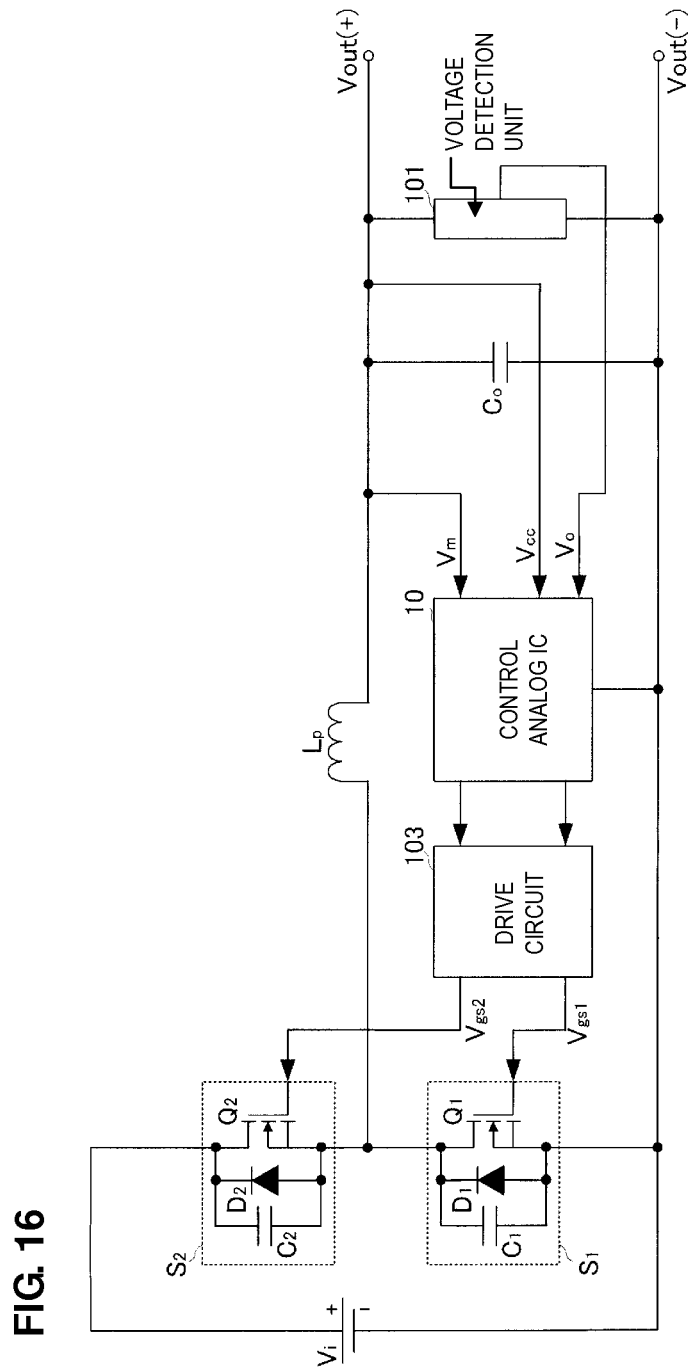
FIG. 16 is a circuit diagram of a switching power supply apparatus according to an eighth preferred embodiment of the present invention.

Next, a switching power supply apparatus according to an eighth preferred embodiment of the present invention will be described with reference to the drawings. FIG. 16 is the circuit diagram of a switching power supply apparatus according to the eighth preferred embodiment of the present invention.

In the present preferred embodiment, in the same or substantially the same manner as the switching power supply apparatus illustrated in the seventh preferred embodiment, a case in which the above-described switching control is applied to a non-isolated-type converter will be described as an example.

Preferably, the voltage output terminal Vout(+) is connected to one end portion (Vi(+)) of the input power supply Vi, to which the direct-current input voltage is applied, through a series circuit including the second switch circuit Q2 and the inductor Lp. On the other hand, the other end portion (Vi(−)) of the input power supply Vi is connected to the voltage output terminal Vout(−).

The second switch circuit S2 includes the second switching element Q2 preferably including a FET, for example, the diode D2, and the capacitor C2. The diode D2 and the capacitor C2 are connected in parallel between the drain and the source of the second switching element Q2, and may be replaced with a parasitic diode and a parasitic capacitance of the second switching element Q2 that is preferably a FET, for example. The second switching element Q2 performs an on-off operation based on the second switching control signal Vgs2 supplied from the control analog IC 10 through the drive circuit 103.

The first switch circuit S1 is connected between a connection point between the second switch circuit S2 and the inductor Lp and the voltage output terminal Vout(−).

The first switch circuit S1 includes the first switching element Q1 preferably including a FET, the diode D1, and the capacitor C1. The diode D1 and the capacitor C1 are connected in parallel between the drain and the source of the first switching element Q1, and may be replaced with a parasitic diode and a parasitic capacitance of the first switching element Q1 that is preferably a FET, for example. The first switching element Q1 performs an on-off operation based on the first switching control signal Vgs1 supplied from the control analog IC 10 through the drive circuit 103.

In addition, the capacitor Co is connected on voltage output terminals Vout(+) and Vout(−) sides with respect to the inductor Lp between both terminals of the voltage output terminals Vout(+) and Vout(−).

In addition, the voltage detection unit 101 including a series resistance circuit and other suitable circuit elements is connected between both terminals of the voltage output terminals Vout(+) and Vout(−). The voltage detection unit 101 generates the detection voltage signal Vo according to an output voltage level between both terminals of the voltage output terminals Vout(+) and Vout(−), and outputs the detection voltage signal Vo to the control analog IC 10.

In addition, the output voltage between the voltage output terminals Vout(+) and Vout(−) is supplied to the control analog IC 10, as the driving voltage Vcc of the control analog IC 10.

As illustrated in the eighth preferred embodiment, the control analog IC 10 is driven using the driving voltage Vcc, and, based on a first monitor signal Vm1, a second monitor signal Vm2, and the detection voltage signal Vo from the voltage detection unit 101, generates the first switching control signal Vgs1 and the second switching control signal Vgs2 so that the output voltage is controlled to become a predetermined voltage level.

The drive circuit 103 inputs and boosts the first switching control signal Vgs1 and the second switching control signal Vgs2 into signals whose levels can drive at least the second switching element Q2. The drive circuit 103 outputs the first switching control signal Vgs1 to the first switching element Q1 and outputs the second switching control signal Vgs2 to the second switching element Q2.

By providing such a configuration, it is possible to produce a half-bridge-type non-isolated buck converter in which the second switching element Q2 of the second switch circuit S2 is used as a control-use switching element and the first switching element Q1 of the first switch circuit S1 is provided in place of a diode. In addition, even in such a configuration, using the above-described switching control, it is possible to obtain a non-isolated-type buck converter having a high degree of reliability and a high degree of efficiency.

Ninth Preferred Embodiment

Figure 17:
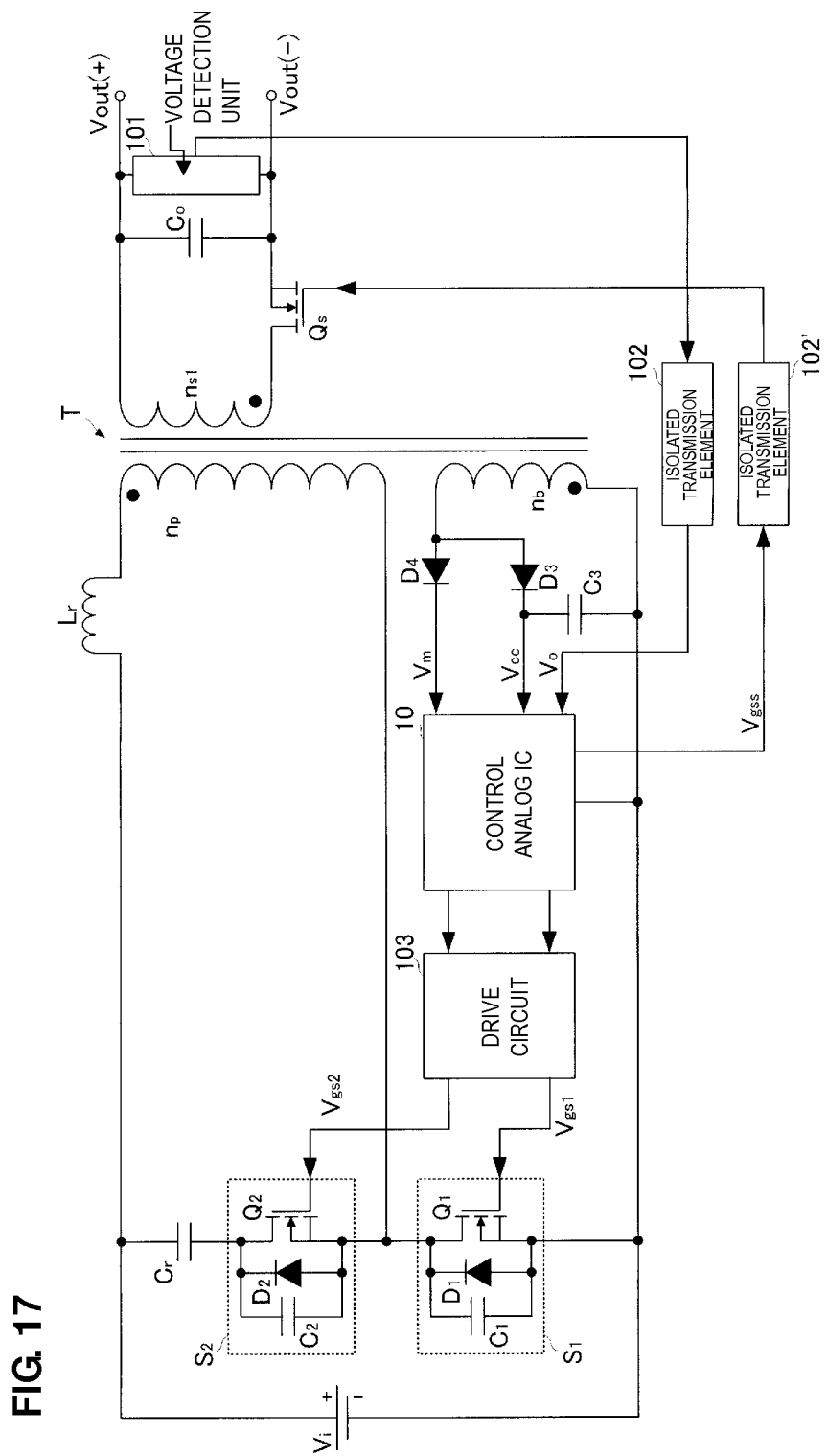
FIG. 17 is a circuit diagram of a switching power supply apparatus according to a ninth preferred embodiment of the present invention.

Next, a switching power supply apparatus according to a ninth preferred embodiment of the present invention will be described with reference to the drawings. FIG. 17 is the circuit diagram of a switching power supply apparatus according to the ninth preferred embodiment of the present invention.

The switching power supply apparatus according to the present preferred embodiment corresponds to a switching power supply apparatus in which the diode Ds on the secondary side is replaced with a switching element Qs in the flyback-method switching power supply apparatus illustrated in FIG. 1 according to the first preferred embodiment. In such a configuration, preferably, the control analog IC 10 also generates a switch control signal Vgss for the switching element Qs in addition to the first switching element Q1 of the first switch circuit S1 and the second switching element Q2 of the second switch circuit S2. At this time, the control analog IC 10 generates the switch control signal Vgss so that the switching element Qs operates in the same or substantially the same manner as the diode Ds in the first preferred embodiment. In this manner, the switch control signal Vgss generated in the control analog IC 10 is supplied to the switching element Qs through a second isolated transmission element 102'. In addition, in the same or substantially the same manner as the first switching control signal Vgs1 and the second switching control signal Vgs2, after being boosted by a drive circuit or other circuit element as necessary, the switch control signal Vgss is supplied to the switching element Qs.

Figure 18:
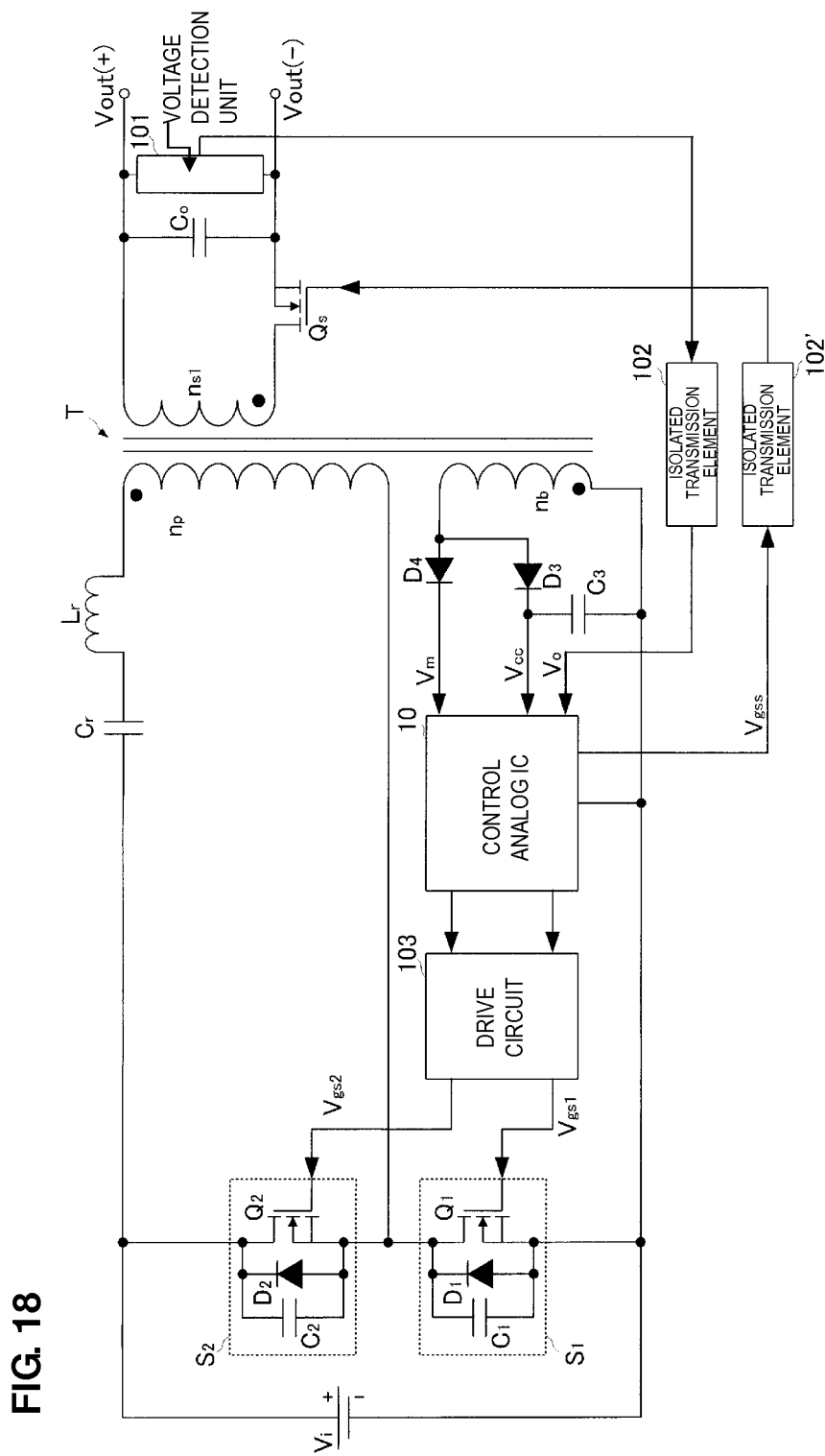
FIG. 18 is a circuit diagram of a switching power supply apparatus including another circuit configuration according to the ninth preferred embodiment of the present invention.

In addition, in the present preferred embodiment, in the same or substantially the same manner as the first preferred embodiment, a circuit configuration may also be used in which the capacitor Cr is connected in series to the input power supply Vi, as illustrated in FIG. 18. FIG. 18 is the circuit diagram of a switching power supply apparatus including another circuit configuration according to the ninth preferred embodiment.

Even in these configurations, it is possible to provide the switching control according to a preferred embodiment of the present invention, and it is possible to obtain the same or substantially the same functional effects.

Tenth Preferred Embodiment

Figure 19:
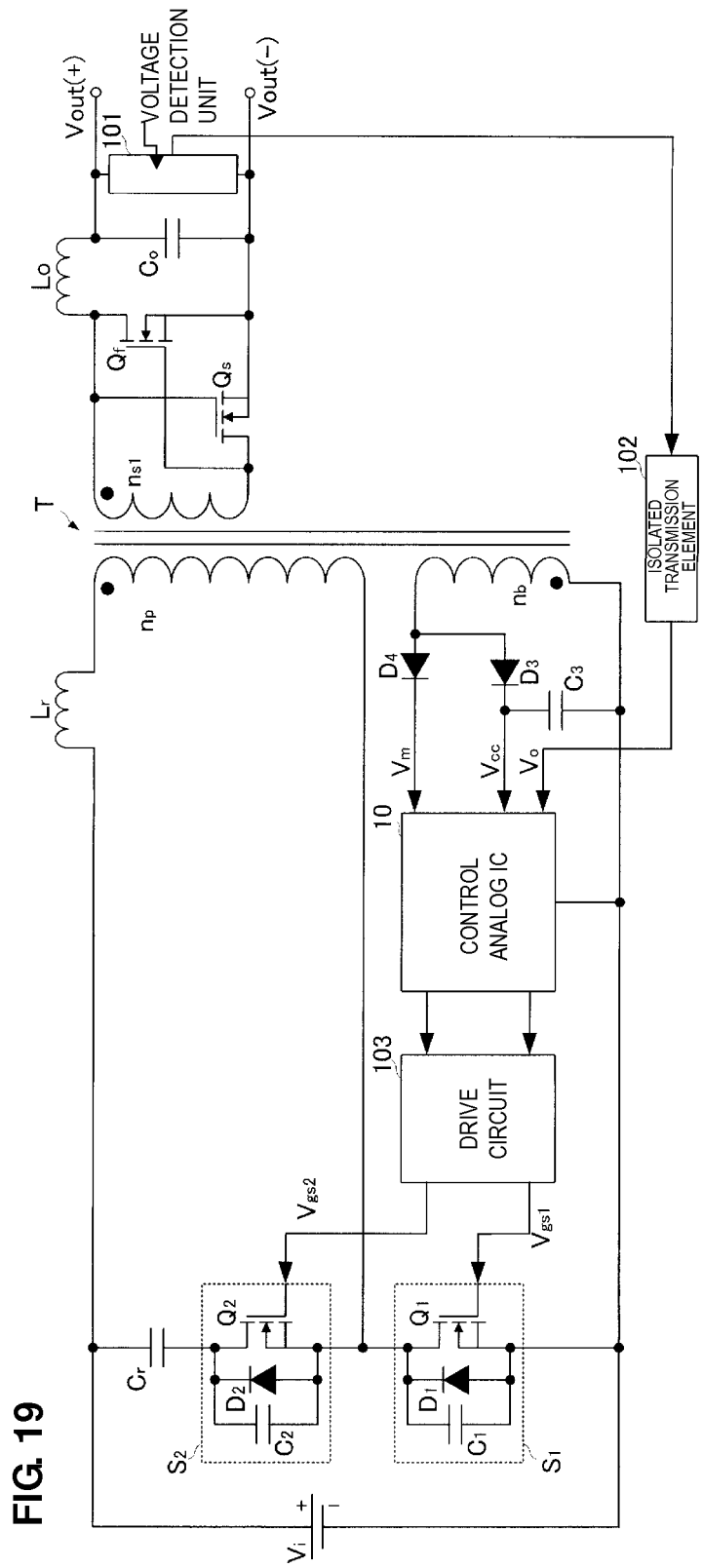
FIG. 19 is a circuit diagram of a switching power supply apparatus according to a tenth preferred embodiment of the present invention.

Next, a switching power supply apparatus according to a tenth preferred embodiment of the present invention will be described with reference to the drawings. FIG. 19 is the circuit diagram of a switching power supply apparatus according to the tenth preferred embodiment of the present invention.

The switching power supply apparatus according to the present preferred embodiment corresponds to a switching power supply apparatus in which the diode Ds on the secondary side is replaced with a switching element Qs and the diode Df is replaced with a switching element Qf in the forward-method switching power supply apparatus illustrated in FIG. 6 according to the second preferred embodiment. In such a configuration, the switching element Qs corresponding to a rectification-side synchronous rectifying element and the switching element Qf corresponding to a commutation-side synchronous rectifying element preferably define a self-driven synchronous rectifying circuit in which on-off operations are complementarily performed in response to the change of magnetic flux in the secondary winding ns of the transformer T.

Even in this configuration, it is possible to provide the switching control according to a preferred embodiment of the present invention, and it is possible to obtain the same or substantially the same functional effects.

Eleventh Preferred Embodiment

Figure 20:
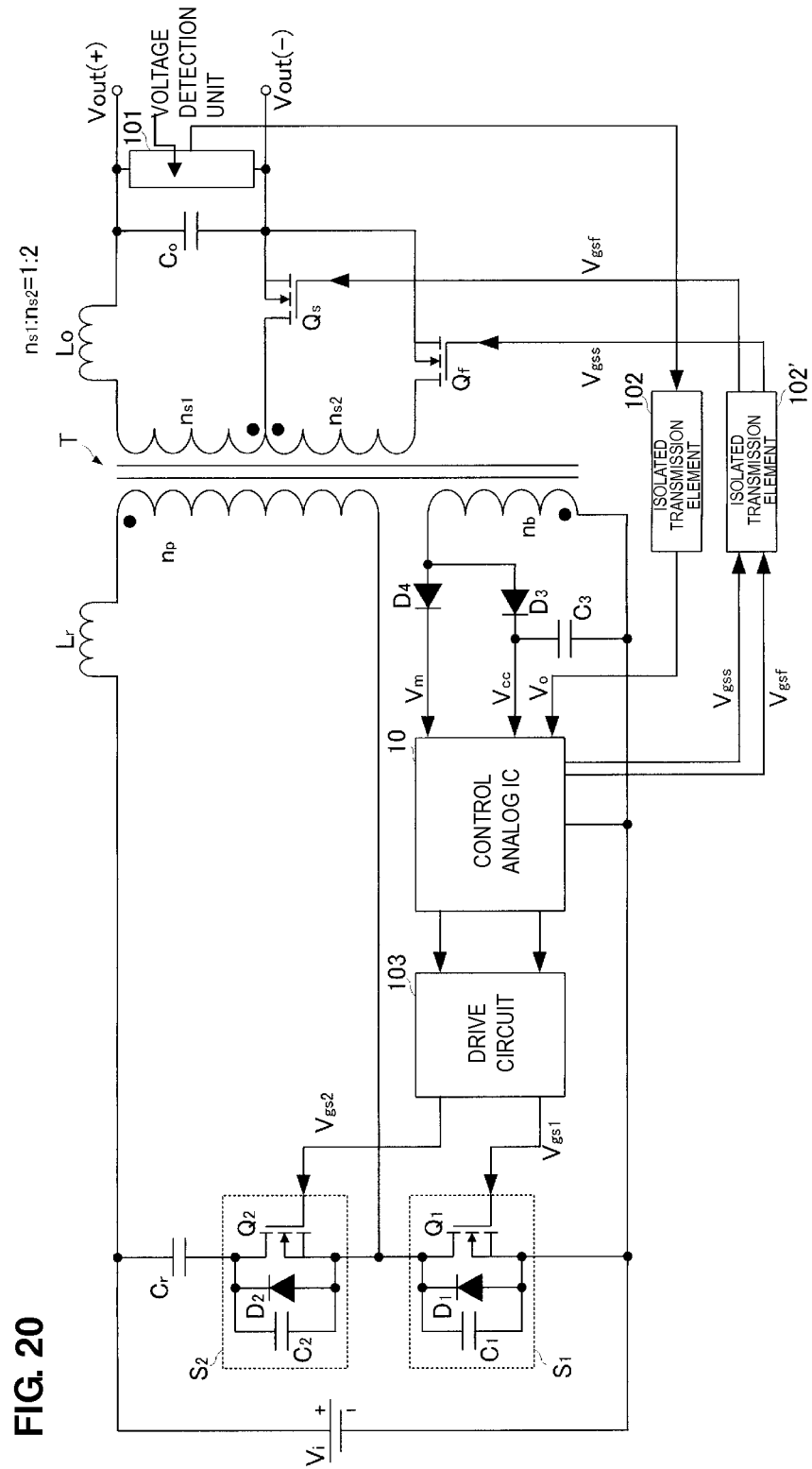
FIG. 20 is a circuit diagram of a switching power supply apparatus according to an eleventh preferred embodiment of the present invention.

Next, a switching power supply apparatus according to an eleventh preferred embodiment of the present invention will be described with reference to drawings. FIG. 20 is the circuit diagram of a switching power supply apparatus according to the eleventh preferred embodiment of the present invention.

The switching power supply apparatus according to the present preferred embodiment corresponds to a switching power supply apparatus in which the diode Ds on the secondary side is replaced with the switching element Qs and the diode Df is replaced with the switching element Qf in the switching power supply apparatus illustrated in FIG. 7 according to the third preferred embodiment. In such a configuration, preferably, the control analog IC 10 also generates a switch control signal Vgss for the switching element Qs and a switch control signal Vgsf for the switching element Qf in addition to the first switching element Q1 of the first switch circuit S1 and the second switching element Q2 of the second switch circuit S2. At this time, the control analog IC 10 generates the switch control signal Vgss so that the switching element Qs operates in the same or substantially the same manner as the diode Ds in the first preferred embodiment. In addition, the control analog IC 10 generates the switch control signal Vgsf so that the switching element Qf operates in the same or substantially the same manner as the diode Df in the first preferred embodiment. In this, manner, the switch control signals Vgss and Vgsf generated in the control analog IC 10 are supplied to the switching elements Qs and Qf through the second isolated transmission element 102'. In addition, in the same or substantially the same manner as the first switching control signal Vgs1 and the second switching control signal Vgs2, after being boosted by a drive circuit or other circuit element as necessary, the switch control signals Vgss and Vgsf are supplied to the switching elements Qs and Qf.

Figure 21:
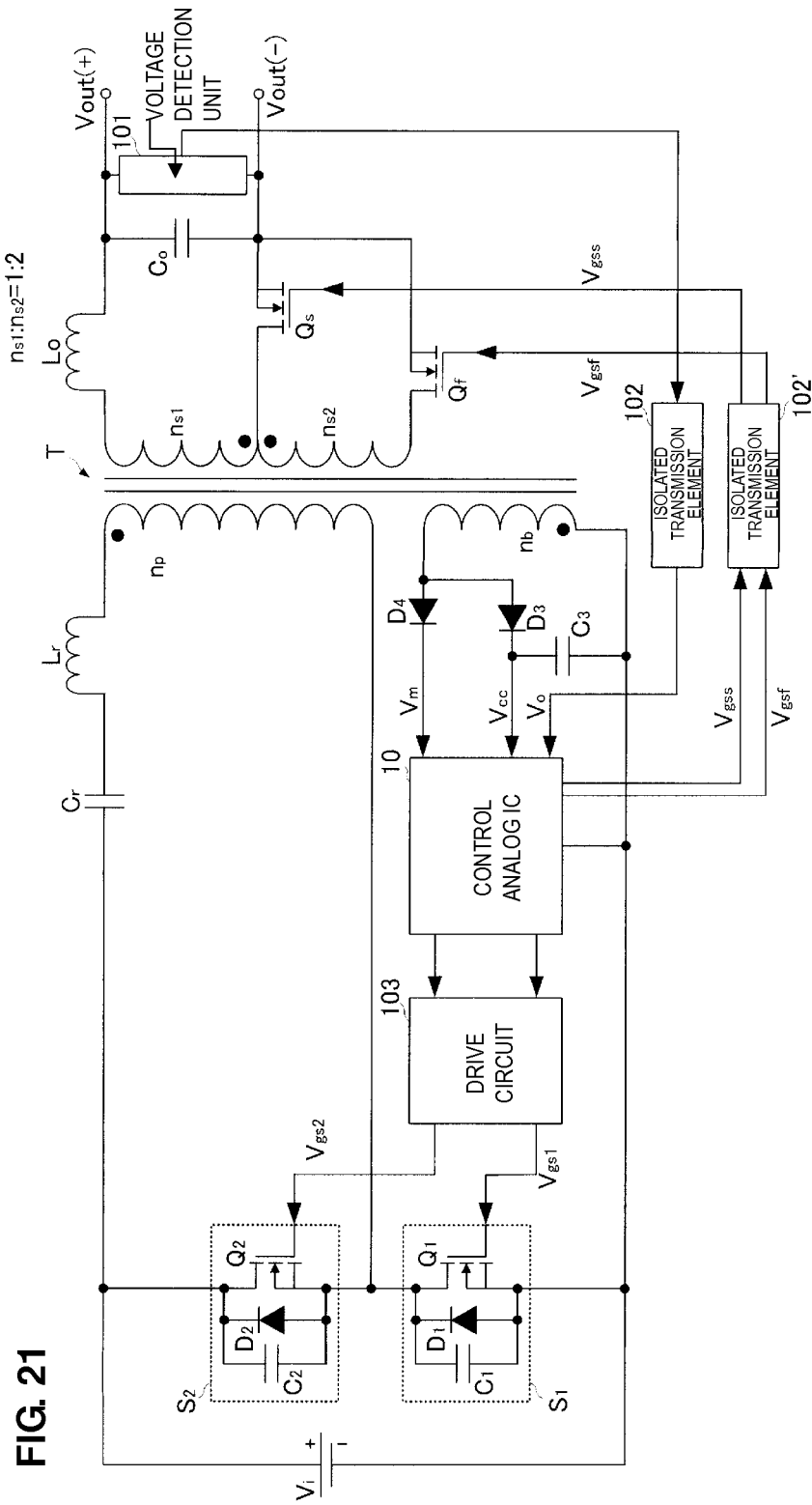
FIG. 21 is a circuit diagram of a switching power supply apparatus including another circuit configuration according to the eleventh preferred embodiment of the present invention.

In addition, in the present preferred embodiment, in the same or substantially the same manner as the third preferred embodiment, a circuit configuration may also be provided in which the capacitor Cr is connected in series to the input power supply Vi, as illustrated in FIG. 21. FIG. 21 is the circuit diagram of a switching power supply apparatus including another circuit configuration according to the eleventh preferred embodiment.

Even in these configurations, it is possible to provide the switching control according to a preferred embodiment of the present invention, and it is possible to obtain the same or substantially the same functional effects.

Twelfth Preferred Embodiment

Figure 22:
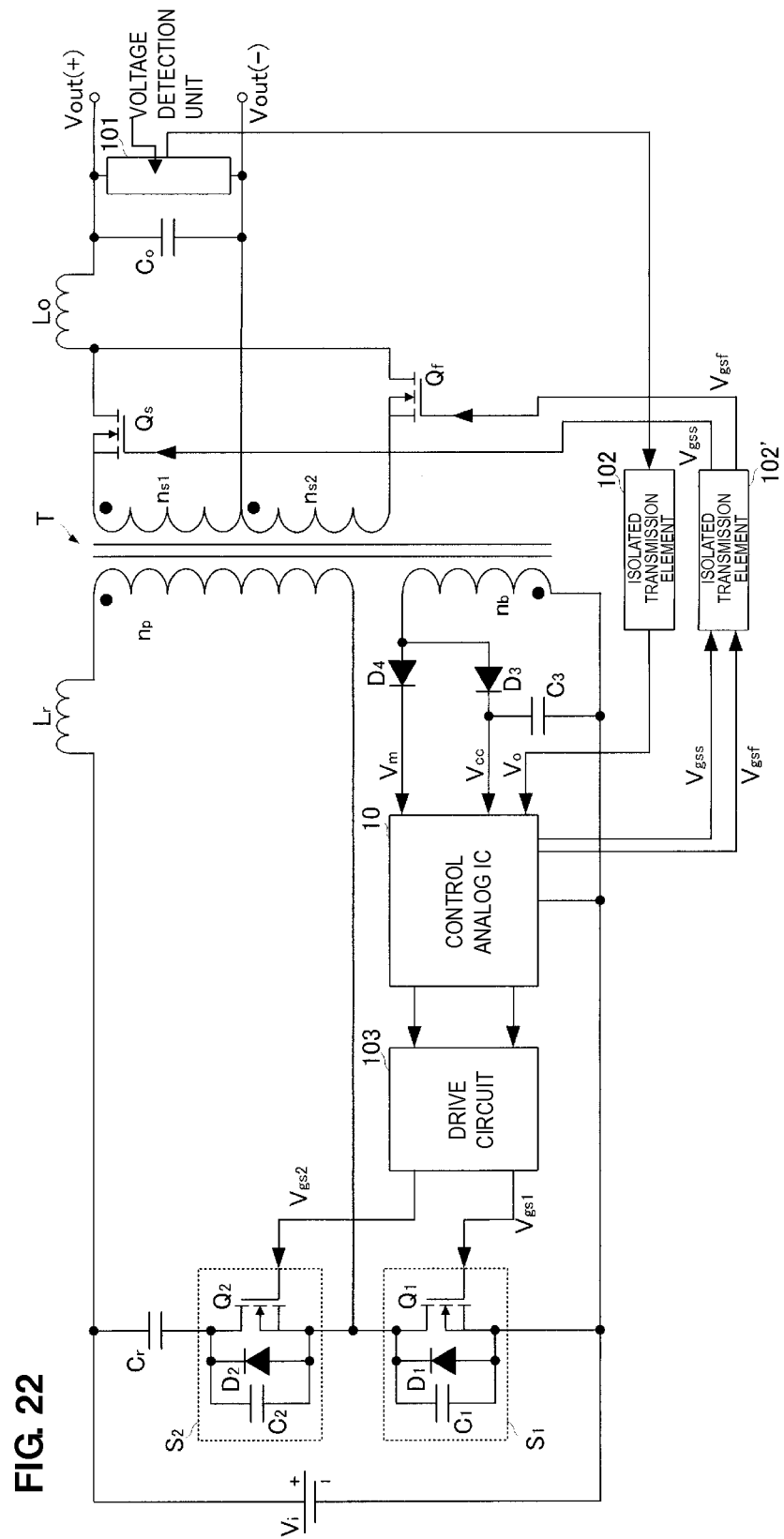
FIG. 22 is a circuit diagram of a switching power supply apparatus according to a twelfth preferred embodiment of the present invention.

Next, a switching power supply apparatus according to a twelfth preferred embodiment of the present invention will be described with reference to drawings. FIG. 22 is the circuit diagram of a switching power supply apparatus according to the twelfth preferred embodiment of the present invention.

The switching power supply apparatus according to the present preferred embodiment corresponds to a switching power supply apparatus in which the diode Ds on the secondary side is replaced with the switching element Qs and the diode Df is replaced with the switching element Qf in the switching power supply apparatus including the center tap-type full-wave rectifier circuit, as illustrated in FIG. 10 according to the fourth preferred embodiment. In such a configuration, the control analog IC 10 also generates the switch control signal Vgss for the switching element Qs and the switch control signal Vgsf for the switching element Qf in addition to the first switching element Q1 of the first switch circuit S1 and the second switching element Q2 of the second switch circuit S2. At this time, the control analog IC 10 generates the switch control signal Vgss so that the switching element Qs operates in the same or substantially the same manner as the diode Ds in the first preferred embodiment. In addition, the control analog IC 10 generates the switch control signal Vgsf so that the switching element Qf operates in the same or substantially the same manner as the diode Df in the first preferred embodiment. In this manner, the switch control signals Vgss and Vgsf generated in the control analog IC 10 are supplied to the switching elements Qs and Qf through the second isolated transmission element 102'. In addition, in the same or substantially the same manner as the first switching control signal Vgs1 and the second switching control signal Vgs2, after being boosted by a drive circuit or other circuit element as necessary, the switch control signals Vgss and Vgsf are supplied to the switching elements Qs and Qf.

Figure 23:
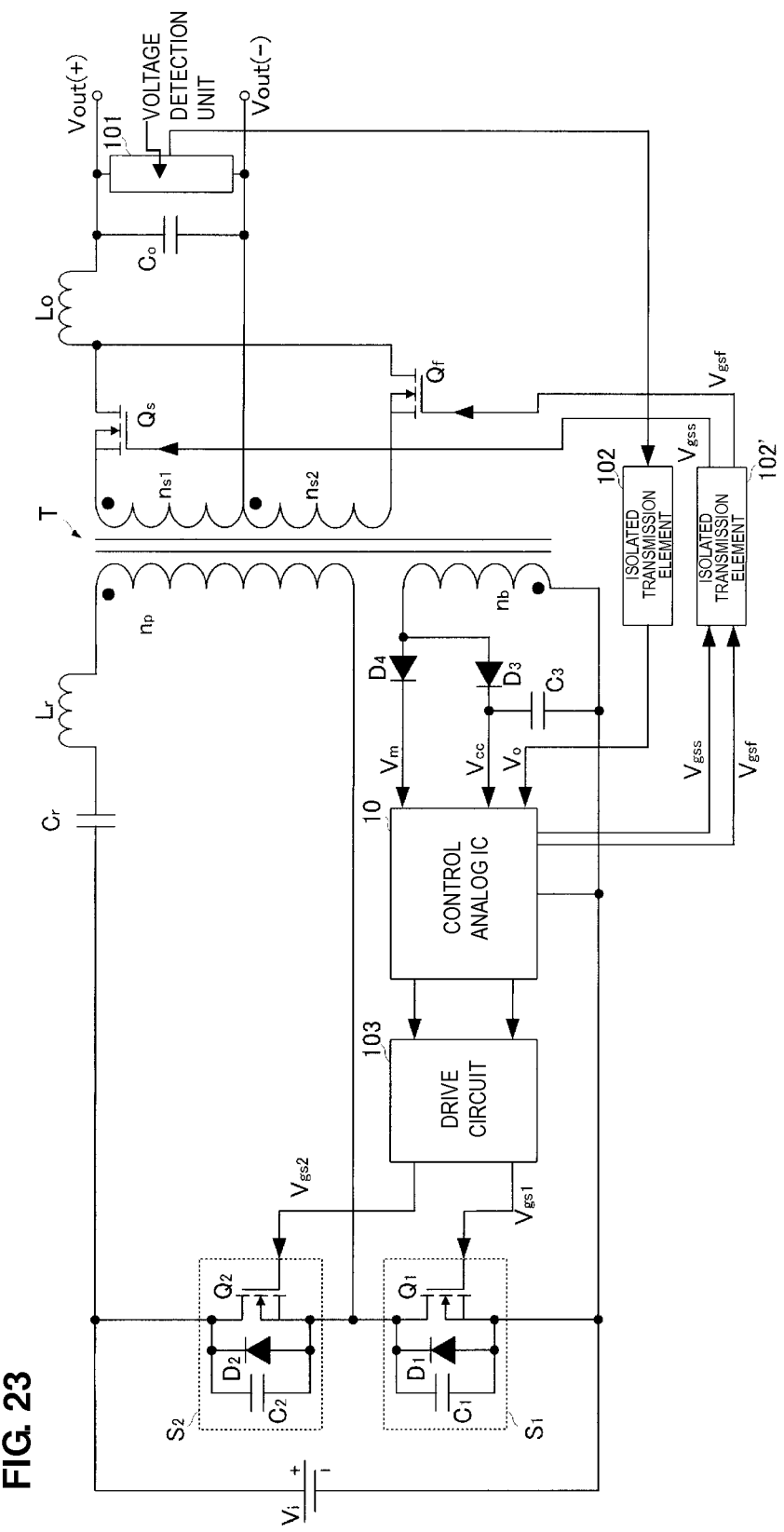
FIG. 23 is a circuit diagram of a switching power supply apparatus including another circuit configuration according to the twelfth preferred embodiment of the present invention.

In addition, in the present preferred embodiment, in the same or substantially the same manner as in the fourth preferred embodiment, a circuit configuration may also be provided in which the capacitor Cr is connected in series to the input power supply Vi, as illustrated in FIG. 23. FIG. 23 is the circuit diagram of a switching power supply apparatus including another circuit configuration according to the twelfth preferred embodiment.

Even in these configurations, it is possible to provide the switching control according to a preferred embodiment of the present invention, and it is possible to obtain the same or substantially the same functional effects.

Thirteenth Preferred Embodiment

Figure 24:
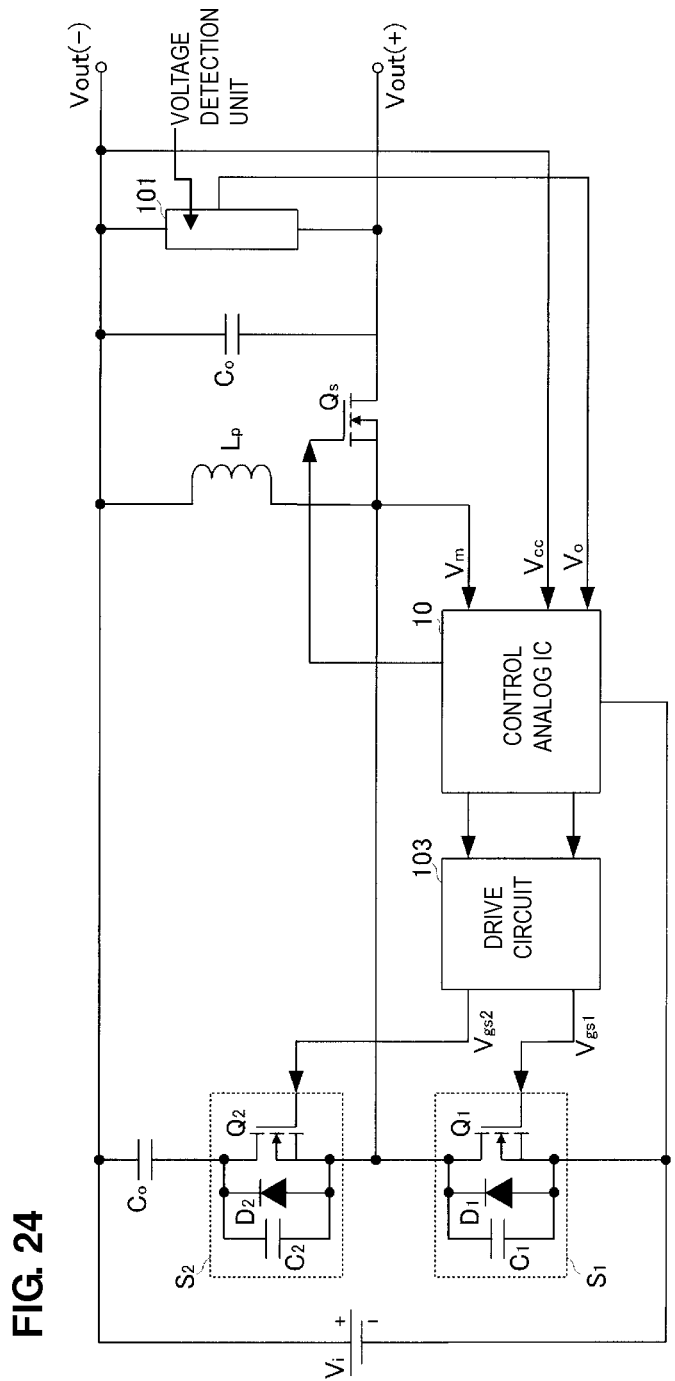
FIG. 24 is a circuit diagram of a switching power supply apparatus according to a thirteenth preferred embodiment of the present invention.

Next, a switching power supply apparatus according to a thirteenth preferred embodiment of the present invention will be described with reference to the drawings. FIG. 24 is the circuit diagram of a switching power supply apparatus according to the thirteenth preferred embodiment of the present invention.

The switching power supply apparatus according to the present preferred embodiment corresponds to a switching power supply apparatus in which the diode Ds on the primary side is replaced with the switching element Qs in the nonisolated-type buck-boost converter illustrated in FIG. 15 according to the seventh preferred embodiment.

In such a configuration, the control analog IC 10 also generates the switch control signal Vgss for the switching element Qs in addition to the first switching element Q1 of the first switch circuit S1 and the second switching element Q2 of the second switch circuit S2. At this time, the control analog IC 10 generates the switch control signal Vgss so that the switching element Qs operates in the same or substantially the same manner as the diode Ds in the seventh preferred embodiment. In this manner, the switch control signal Vgss generated in the control analog IC 10 is supplied to the switching element Qs. In addition, in the same or substantially the same manner as the first switching control signal Vgs1 and the second switching control signal Vgs2, after being boosted by a drive circuit or other circuit element as necessary, the switch control signal Vgss is supplied to the switching element Qs.

Even in such a configuration, it is possible to provide the switching control according to a preferred embodiment of the present invention, and it is possible to obtain the same or substantially the same functional effects.

In addition, the above-described individual preferred embodiments illustrate representative circuit examples to which the switching control according to a preferred embodiment of the present invention is applicable, and it should be understood that a switching power supply apparatus including a circuit that can be provided from a combination of the preferred embodiments can also obtain such a functional effect as described above.

In addition, while, in the above-described preferred embodiments, examples have been illustrated using the monitor signal based on the change of the voltage between the drain and source of the switching element, a Hall sensor may also be provided in the transmission line connecting the switching element Q1 and the switching element side of the primary winding np to each other, and an output from the corresponding Hall sensor may also be used as a monitor signal, for example, in the configuration of the primary side circuit of the first preferred embodiment. Accordingly, it is also possible to generate a monitor signal based on the change of a current flowing through the switching element.

In addition, while, in each of the above-described preferred embodiments, an example has been illustrated in which two threshold values used for the first switching control signal Vgs1 and the second switching control signal Vgs2 are preferably set with respect to one monitor signal, a monitor signal may also be set with respect to each switching control signal and a threshold value may also be set for each monitor signal. At this time, in an arrangement in which a bias winding is disposed, an output from the bias winding may also be used as a monitor signal.

In addition, while, in the above-described preferred embodiments, the turn off timings of the individual switching elements, namely, the on times of the individual switching elements, are set based on the periodicity of the saw-tooth wave signal Vchp, the maximum value of the on time may also be restricted by detecting a current flowing through the transformer T or the inductor Lp or a current flowing through the switching element. Accordingly, it is possible to prevent an overcurrent from flowing in the above-described switching control.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A switching power supply apparatus comprising:
a direct-current power-supply input unit to which a direct-current input voltage is input;
a transformer defined by one magnetic component and including at least a first primary winding and a first secondary winding that are magnetically coupled;
an inductor connected in series to the first primary winding;
a first switch circuit including a parallel circuit including a first switching element, a first capacitor, and a first diode;
a second switch circuit including a parallel circuit including a second switching element, a second capacitor, and a second diode;
a third capacitor;
a first series circuit connected to both end portions of the direct-current power-supply input unit and in which the first primary winding and the first switch circuit are connected in series; and
a second series circuit connected to both end portions of the first switch circuit or both end portions of the first primary winding and in which the second switch circuit and the third capacitor are connected in series; wherein
the first switch circuit and the second switch circuit are arranged to operate so that the first switch circuit and the second switch circuit complementarily repeat turning on and turning off with a time period in between, for which both of the first switch circuit and the second switch circuit are turned off; and
the switching power supply apparatus further includes:
a power converter circuit arranged so that an output voltage is output to a secondary side through a first rectification smoothing circuit arranged to rectify and smooth an alternating-current voltage output from the first secondary winding;
a first monitor signal generator arranged to detect a change of a voltage or a current in the power converter circuit, which occurs due to the turning off of a switch circuit in an on state from among the first switch circuit and the second switch circuit, and to generate a monitor signal having a low level and a high level;
an output voltage detector arranged to detect the output voltage;
a feedback signal generator arranged to generate a feedback signal according to the output voltage detected by the output voltage detector;
a switching control circuit arranged to control the first switching element and the second switching element; wherein the switching control circuit includes an oscillator arranged to generate a triangular wave whose frequency is settable and nearly constant; and
a first comparator arranged to compare the triangular wave signal with the feedback signal, and a second comparator arranged to compare an output signal of the first monitor signal generator with a first threshold value;
a gate signal of the first switch circuit and a gate signal of the second switch circuit are generated based on outputs of the first comparator and the second comparator;
the first threshold value is set to an electrical potential equal or substantially equal to the low level of the monitor signal;
the switching control circuit is arranged to set a dead time in which both of the first switching element and the second switching element are turned off for a time period that is suitable for a load added to the output voltage; and the switching control circuit is arranged to control an on-time of the first and second switching elements so as to maintain a constant switching period in order to obtain a desired output voltage.

2. The switching power supply apparatus according to claim 1, wherein a magnetic polarity of the first primary winding and the first secondary winding is a reverse polarity with respect to a direction of a current flowing when the first switch circuit is in a conduction state or the second switch circuit is in a conduction state.

3. The switching power supply apparatus according to claim 1, wherein a magnetic polarity of the first primary winding and the first secondary winding is the same polarity with respect to a direction of a current flowing when the first switch circuit is in a conduction state or the second switch circuit is in a conduction state.

4. The switching power supply apparatus according to claim 1, wherein the transformer further includes a second secondary winding, the first secondary winding and the second secondary winding are connected in series, and a magnetic polarity of the first primary winding and the first secondary winding and a magnetic polarity of the first primary winding and the second secondary winding are the same polarities with respect to a direction of a current flowing when the first switch circuit is in a conduction state or the second switch circuit is in a conduction state; and the first rectification smoothing circuit includes a center tap-type full-wave rectifier circuit, at least one filter inductor, and at least one smoothing capacitor.

5. The switching power supply apparatus according to claim 4, wherein a turn ratio between the first secondary winding and the second secondary winding is 1:2.

6. The switching power supply apparatus according to claim 5, wherein the first monitor signal generator is arranged to utilize a change of a voltage occurring between both end portions of the second secondary winding.

7. The switching power supply apparatus according to claim 1, wherein the transformer further includes a second secondary winding, the first secondary winding and the second secondary winding are connected in series, and a magnetic polarity of the first primary winding and the first secondary winding is a reverse polarity and a magnetic polarity of the first primary winding and the second secondary winding is the same polarity, with respect to a direction of a current flowing when the first switch circuit is in a conduction state or the second switch circuit is in a conduction state; and in the first rectification smoothing circuit, cathode sides of rectifying elements are connected to both end portions of the second secondary winding, respectively, anode sides of the rectifying elements are subjected to common connection, one end portion of at least one filter inductor is connected to the other end portion of the first secondary winding, and at least one smoothing capacitor is connected between the other end portion of the filter inductor and the anodes of the rectifying elements.

8. The switching power supply apparatus according to claim 1, wherein the transformer further includes a second primary winding, one end portion of the second primary winding is connected on a low electrical potential side of a direct-current input power supply, and the other end portion thereof is supplied as a direct-current power-supply voltage for the switching control circuit through a second rectification smoothing circuit.

9. The switching power supply apparatus according to claim 1, wherein the rectifying element of the first rectification smoothing circuit is subjected to on-off control by the switching control circuit.

10. The switching power supply apparatus according to claim 1, wherein the switching control circuit further includes a third comparator arranged to compare an output signal of the first monitor signal generator with a second threshold value; and the gate signal of the first switch circuit is generated based on the outputs of the first comparator and the second comparator, and the gate signal of the second switch circuit is generated based on the outputs of the first comparator and the third comparator.

11. The switching power supply apparatus according to claim 1, wherein the second comparator is defined by a hysteresis comparator arranged to compare an output signal of the first monitor signal generator with a second threshold value in addition to comparing an output signal of the first monitor signal generator with a first threshold value, and the first threshold value and the second threshold value are specified by the hysteresis comparator.

12. The switching power supply apparatus according to claim 1, wherein a maximum value of an on-time of a pulse width from a time when a signal for turning on one of the first switching element and the second switching element is output to a time when an output signal for turning off the corresponding switching element is generated is restricted to less than a period of the oscillator generating the triangular wave.

13. The switching power supply apparatus according to claim 1, wherein a current flowing through the transformer in the power converter circuit or a current flowing through a switching element is detected, and by restricting a maximum value of the on time, an overcurrent is prevented from flowing.

14. The switching power supply apparatus according to claim 1, wherein the first switch circuit or the second switch circuit is a field-effect transistor and is driven by a zero voltage switching operation in which, after voltages of both end portions of the switch circuit have been decreased to 0 V or the vicinity of 0 V, the first switching element or the second switching element is turned on.

15. The switching power supply apparatus according to claim 1, wherein the first monitor signal generator is arranged to utilize a change of a drain-to-source voltage of at least one of the first switching element and the second switching element.

16. The switching power supply apparatus according to claim 1, wherein
the first monitor signal generator is arranged to utilize a change of a drain-to-source current of at least one of the first switching element and the second switching element.

17. A switching power supply apparatus including
a direct-current power-supply input unit to which a direct-current input voltage is input;
an inductor defined by one magnetic component;
a first switch circuit including a parallel circuit including a first switching element, a first capacitor, and a first diode; and
a second switch circuit including a parallel circuit including a second switching element, a second capacitor, and a second diode; wherein
a series circuit including the first switch circuit and the second switch circuit is connected to both end portions of the direct-current power-supply input unit;
the switching power supply apparatus is arranged so that one end portion of the inductor is connected to a connection point between the first switch circuit and the second switch circuit and, from the other end portion thereof, an output voltage is output through a third capacitor connected in parallel to the first switch circuit;
the first switch circuit and the second switch circuit are arranged to operate so that the first switch circuit and the second switch circuit complementarily repeat turning on and turning off with a time period in between, for which both of the first switch circuit and the second switch circuit are turned off;
the switching power supply apparatus includes:
a first monitor signal generator arranged to detect a change of a voltage or a current in the power converter circuit, which occurs due to the turning off of a switch circuit in an on state from among the first switch circuit and the second switch circuit, and to generate a monitor signal having a low level and a high level;
an output voltage detector arranged to detect the output voltage;
a feedback signal generator arranged to generate a feedback signal according to the output voltage detected by the output voltage detector; and
a switching control circuit arranged to control the first switching element and the second switching element;
the switching control circuit includes an oscillator arranged to generate a triangular wave whose frequency is settable and substantially constant;
a first comparator is arranged to compare the triangular wave signal with the feedback signal, and a second comparator is arranged to compare an output signal of the first monitor signal generator with a first threshold value, wherein a gate signal of the first switch circuit and a gate signal of the second switch circuit are generated based on outputs of the first comparator and the second comparator;
the first threshold value is set to an electrical potential equal or substantially equal to the low level of the monitor signal;
the switching control circuit is arranged to set a dead time in which both of the first switching element and the second switching element are turned off for a time period that is suitable for a load added to the output voltage; and
the switching control circuit is arranged to control an on-time of the first and second switching elements so as to maintain a constant switching period in order to obtain a desired output voltage.

* * * * *